US012646144B2

(12) United States Patent
Tsukagoshi et al.

(10) Patent No.: US 12,646,144 B2
(45) Date of Patent: Jun. 2, 2026

(54) IMAGE PROCESSING APPARATUS AND METHOD, AND STORAGE MEDIUM

(71) Applicant: CANON KABUSHIKI KAISHA, Tokyo (JP)

(72) Inventors: Rieko Tsukagoshi, Kanagawa (JP); Mizuki Matsumoto, Tokyo (JP); Yota Uehara, Kanagawa (JP); Shuichi Hosokawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 548 days.

(21) Appl. No.: 17/959,329

(22) Filed: Oct. 4, 2022

(65) Prior Publication Data

US 2023/0110665 A1     Apr. 13, 2023

(30) Foreign Application Priority Data

Oct. 12, 2021     (JP) ................................. 2021-167575

(51) Int. Cl.
*G06T 3/4076* (2024.01)
*G06T 3/4046* (2024.01)

(52) U.S. Cl.
CPC .......... *G06T 3/4076* (2013.01); *G06T 3/4046* (2013.01)

(58) Field of Classification Search
USPC ........................................................ 382/298
See application file for complete search history.

(56) References Cited

U.S. PATENT DOCUMENTS

| | | | |
|---|---|---|---|
| 9,263,090 B2 | 2/2016 | Hosokawa | |
| 2010/0119156 A1* | 5/2010 | Noguchi | ................ H04N 19/61 |
| | | | 382/285 |
| 2010/0177963 A1* | 7/2010 | Yokomitsu | .............. B61L 23/00 |
| | | | 382/170 |

(Continued)

FOREIGN PATENT DOCUMENTS

| | | |
|---|---|---|
| JP | 2015-201819 A | 11/2015 |
| JP | 2019-129328 A | 8/2019 |
| JP | 2019-204167 A | 11/2019 |

OTHER PUBLICATIONS

Notice of Reasons for Refusal issued by the Japanese Patent Office on Jun. 16, 2025 in corresponding JP Patent Application No. 2021-167575, with English translation.

*Primary Examiner* — Chineyere Wills-Burns
*Assistant Examiner* — Aaron Timothy Bonansinga
(74) *Attorney, Agent, or Firm* — Carter, DeLuca & Farrell LLP

(57) ABSTRACT

An image processing apparatus configured to achieve high definition of an image of a second image group by using a first image group, the second image group having less high-frequency components in a corresponding frame than the first image group, the image processing apparatus comprises a selection unit configured to select, based on a high-definition target image selected from the second image group, a pair of supervisory data to be used for learning, a learning model generation unit configured to generate a learning model by using the pair of supervisory data, an inference unit configured to infer high-frequency components of the high-definition target image by using the learning model generated, and an image generation unit configured to generate a high-definition image based on the high-definition target image and the high-frequency components.

27 Claims, 19 Drawing Sheets

(56)          References Cited

U.S. PATENT DOCUMENTS

| | | | |
|---|---|---|---|
| 2013/0038758 A1* | 2/2013 | Imade | G06T 3/4069 |
| | | | 348/E5.031 |
| 2017/0193680 A1* | 7/2017 | Zhang | G06V 10/82 |
| 2017/0220879 A1* | 8/2017 | Nakamura | B60R 11/04 |
| 2018/0137603 A1* | 5/2018 | Hsiao | G06T 7/90 |
| 2018/0330474 A1* | 11/2018 | Mehta | G06T 3/4084 |
| 2018/0336662 A1* | 11/2018 | Kimura | G06T 5/70 |
| 2019/0005358 A1* | 1/2019 | Pisoni | G06N 3/084 |
| 2020/0041612 A1* | 2/2020 | Harrison | G01S 7/40 |
| 2020/0226718 A1* | 7/2020 | Reddy | G06T 3/4046 |
| 2020/0372608 A1* | 11/2020 | Lee | G06T 3/4053 |
| 2021/0279511 A1* | 9/2021 | Gordon | G06N 3/084 |
| 2022/0222776 A1* | 7/2022 | Porikli | G06T 5/20 |
| 2023/0025778 A1* | 1/2023 | Shoa Hassani Lashdan | |
| | | | H04N 19/139 |
| 2023/0093734 A1* | 3/2023 | Zheng | G06T 1/20 |
| | | | 382/276 |
| 2023/0245273 A1* | 8/2023 | Ishikuri | G06T 7/215 |
| | | | 382/155 |

* cited by examiner

F I G. 2
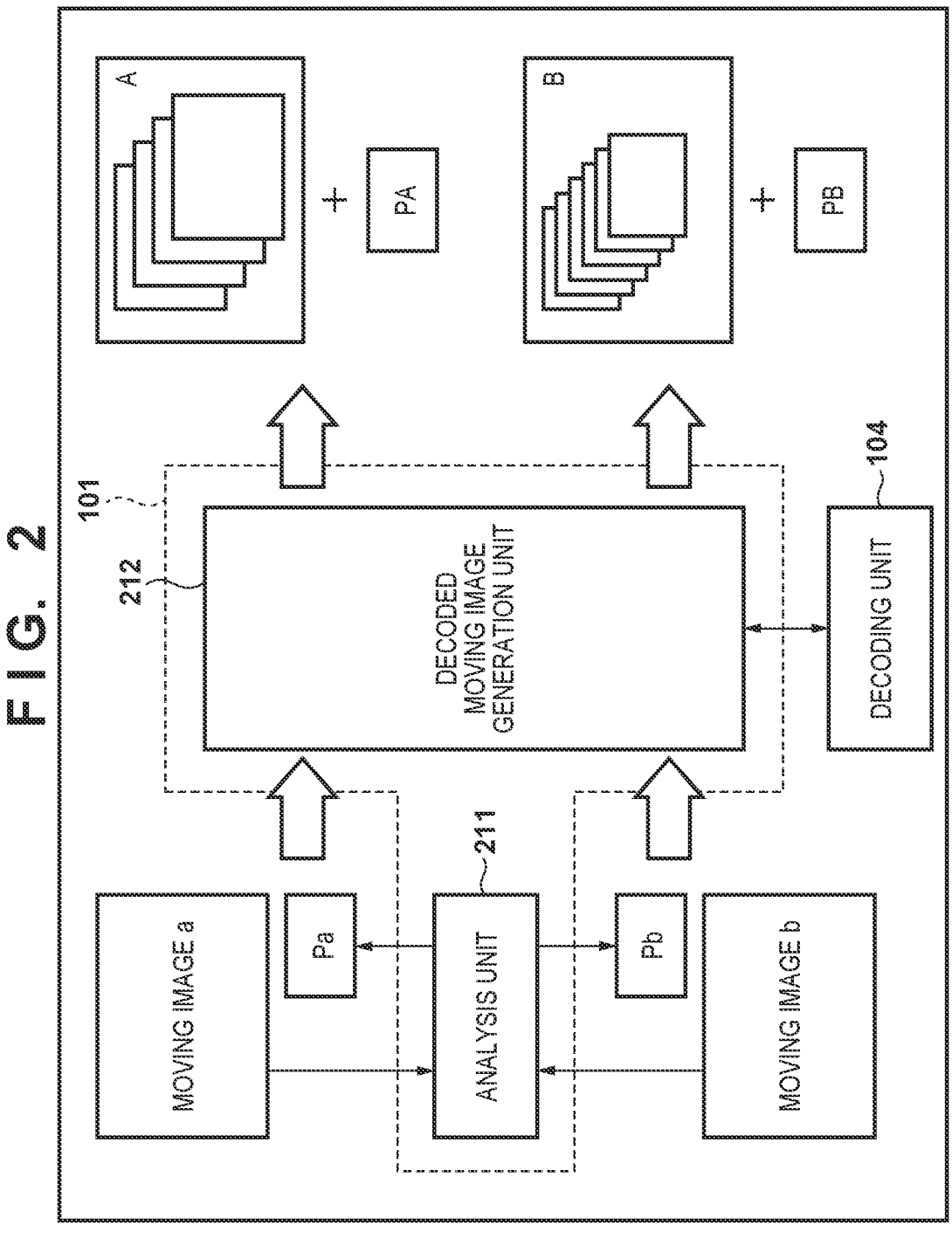

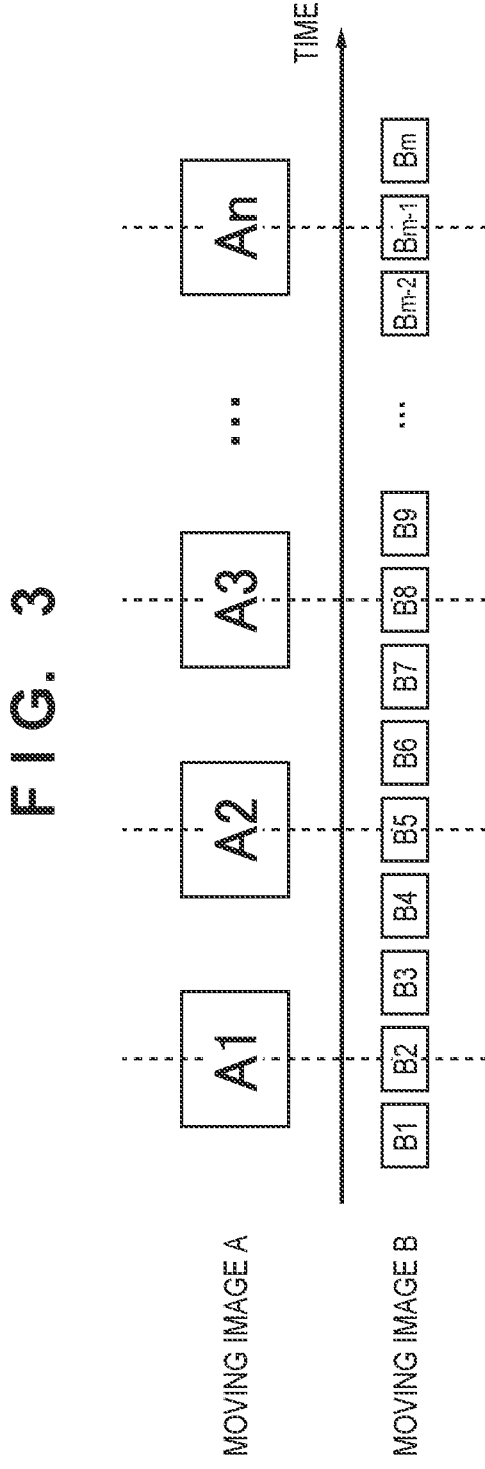
F I G. 3

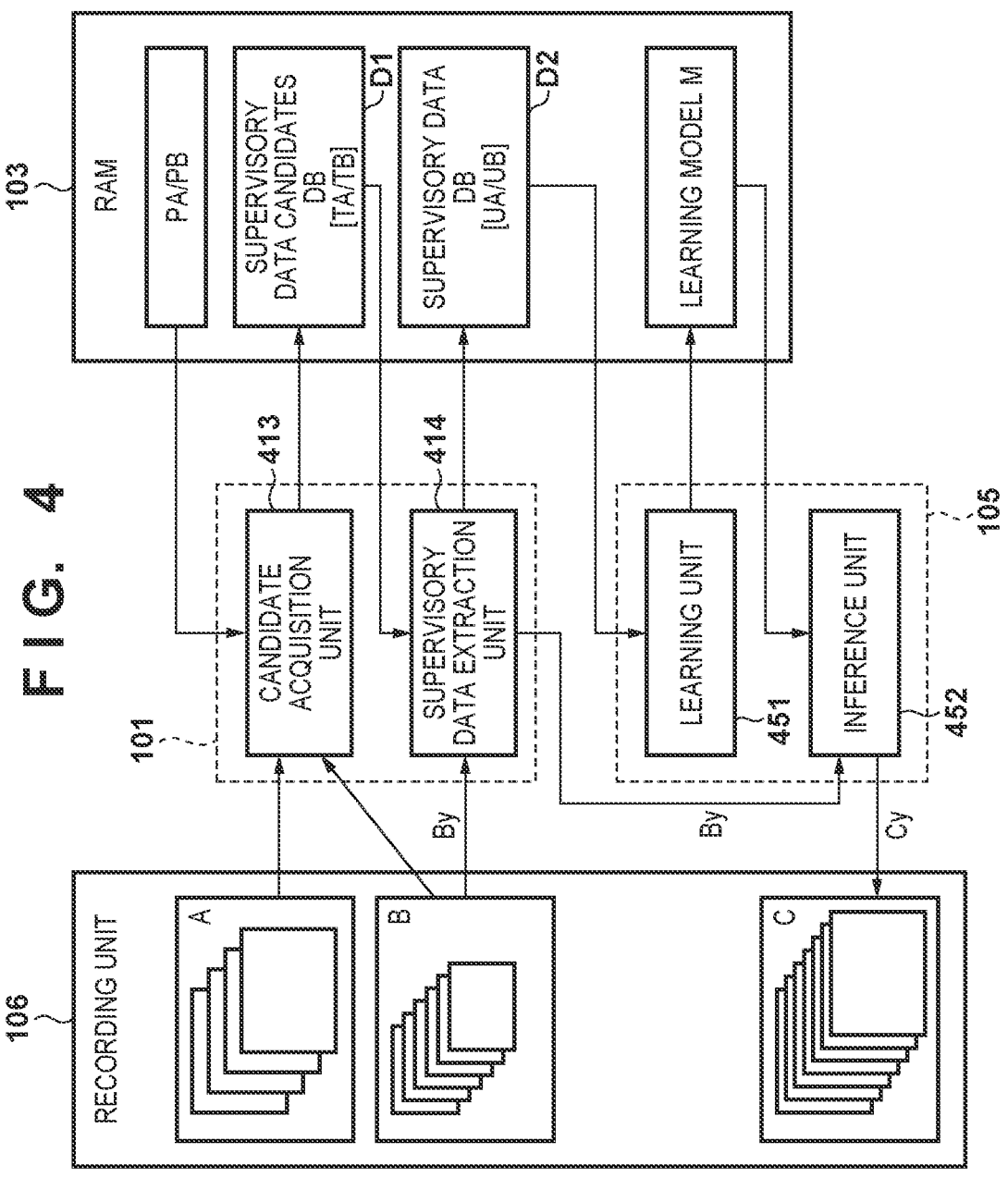
F I G. 4

FIG. 5

| INDEX | FRAME NUMBER OF MOVING IMAGE A | FRAME NUMBER OF MOVING IMAGE B |
|:-----:|:------------------------------:|:------------------------------:|
| 1 | 1 | 2 |
| 2 | 2 | 5 |
| 3 | 3 | 8 |
| ⋮ | ⋮ | ⋮ |
| i-1 | n-1 | m-4 |
| i | n | m-1 |

DATABASE STRUCTURE

F I G. 8
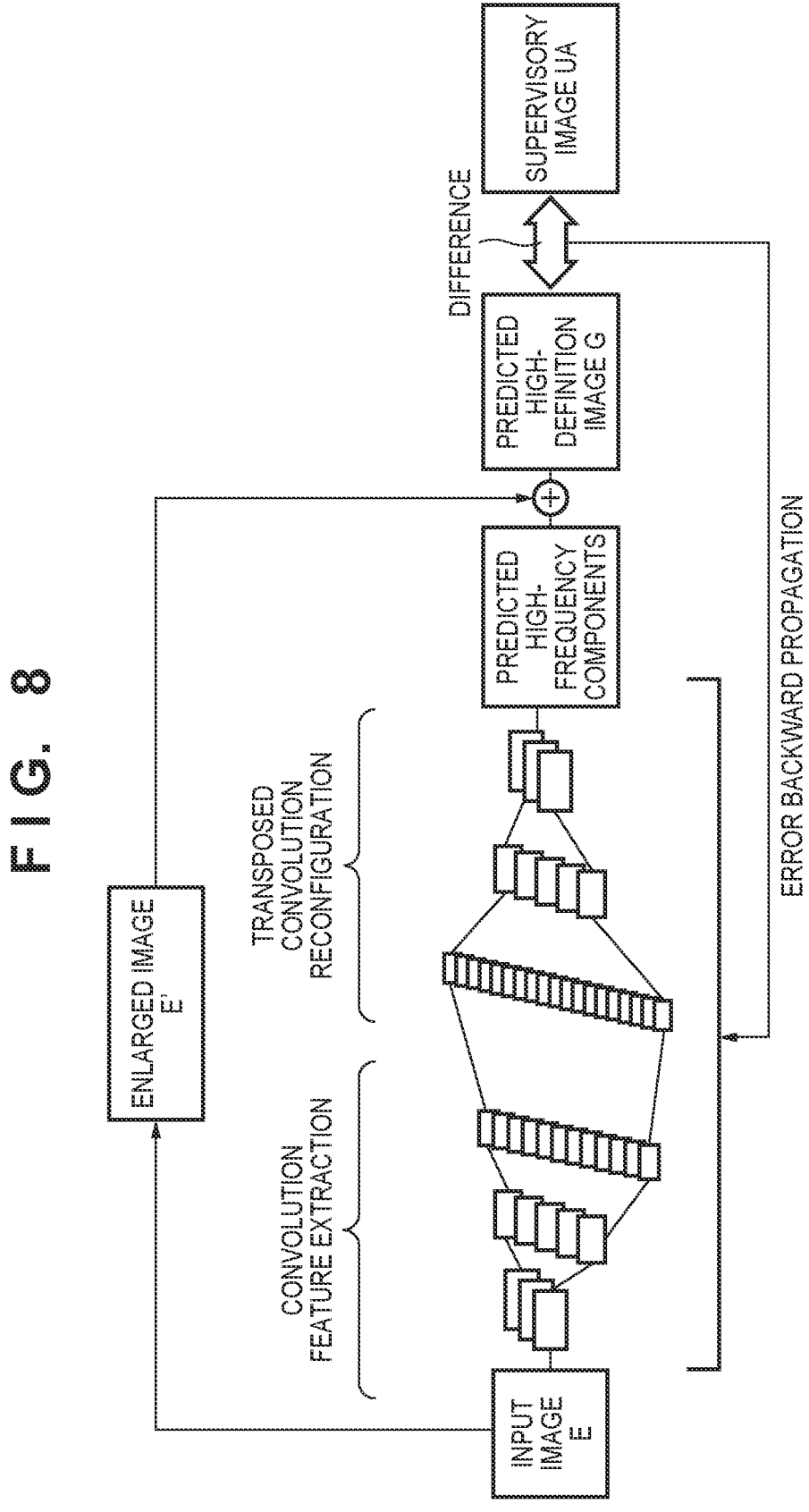

F I G. 10
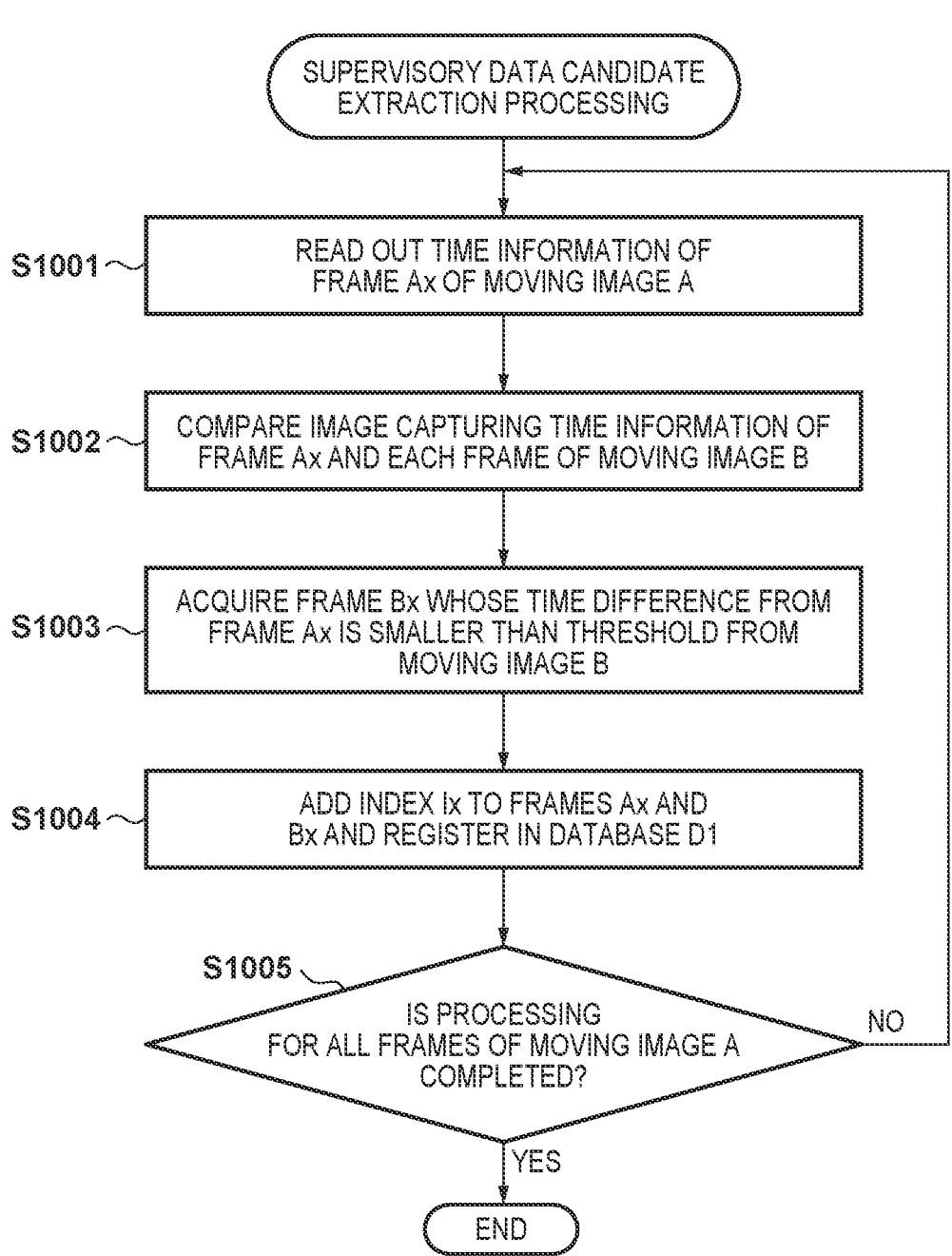

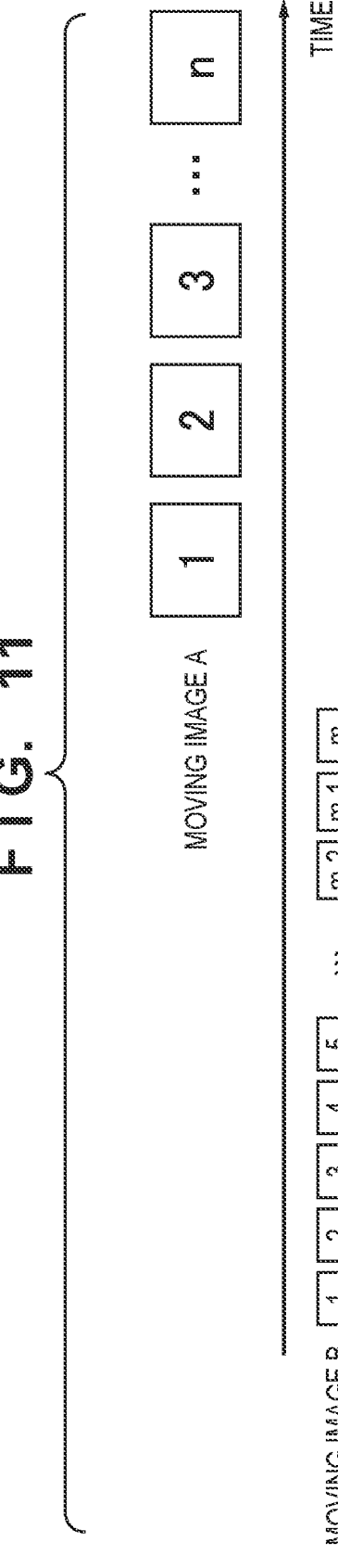
F I G. 11

F I G.  12
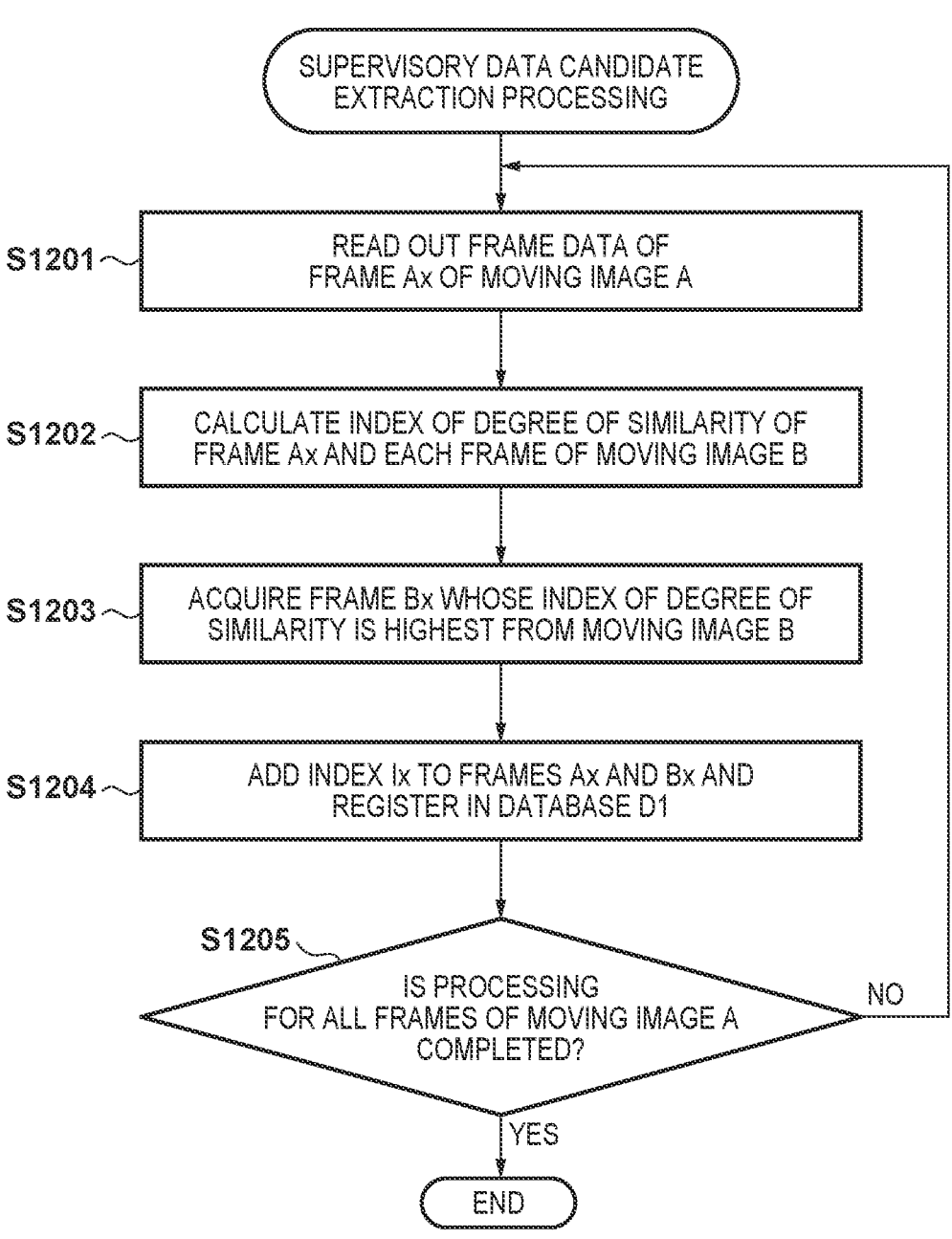

F I G.  15

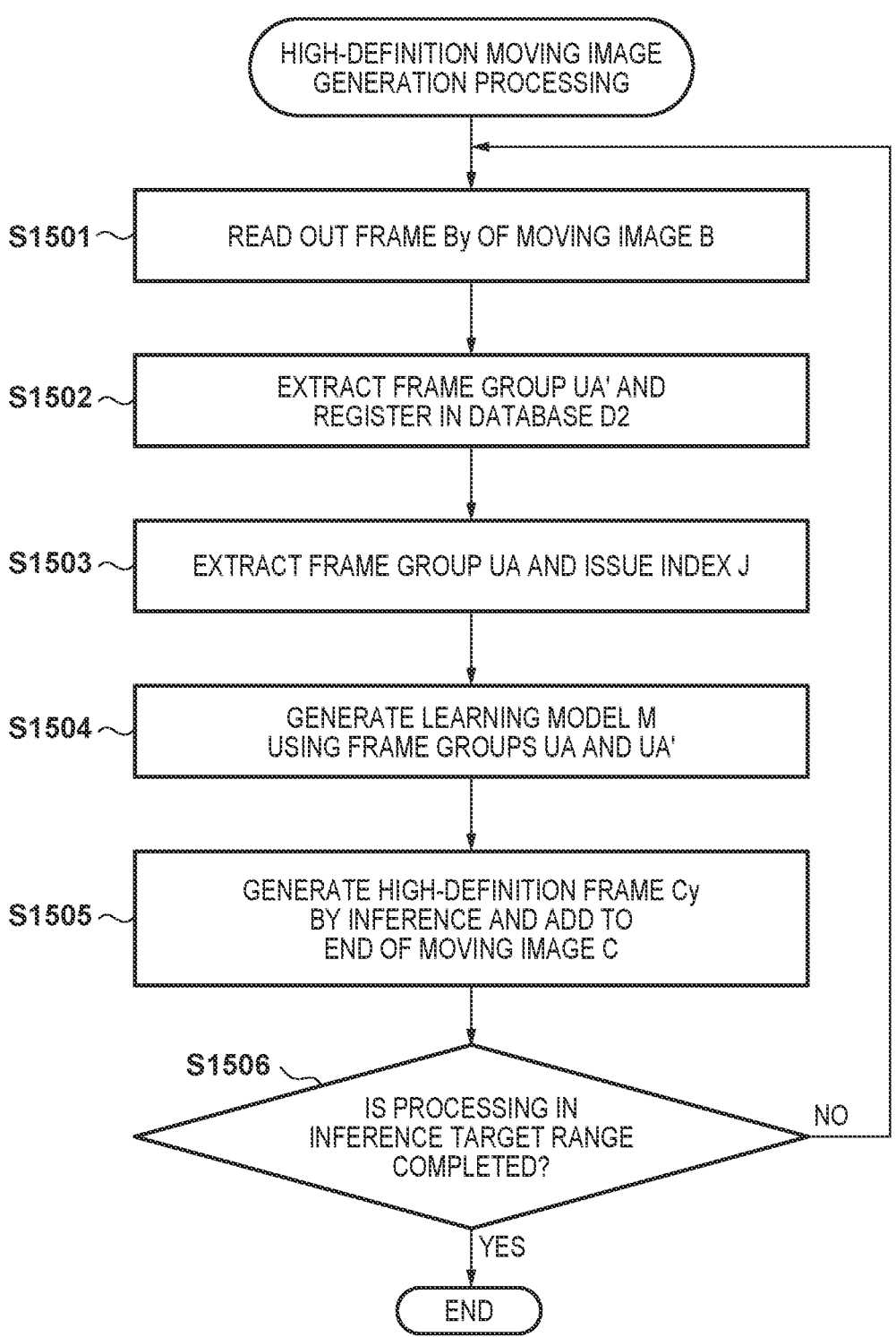

HIGH-DEFINITION MOVING IMAGE
GENERATION PROCESSING

S1501 — READ OUT FRAME By OF MOVING IMAGE B

S1502 — EXTRACT FRAME GROUP UA' AND
REGISTER IN DATABASE D2

S1503 — EXTRACT FRAME GROUP UA AND ISSUE INDEX J

S1504 — GENERATE LEARNING MODEL M
USING FRAME GROUPS UA AND UA'

S1505 — GENERATE HIGH-DEFINITION FRAME Cy
BY INFERENCE AND ADD TO
END OF MOVING IMAGE C

S1506 — IS PROCESSING IN
INFERENCE TARGET RANGE
COMPLETED?    NO

YES

END

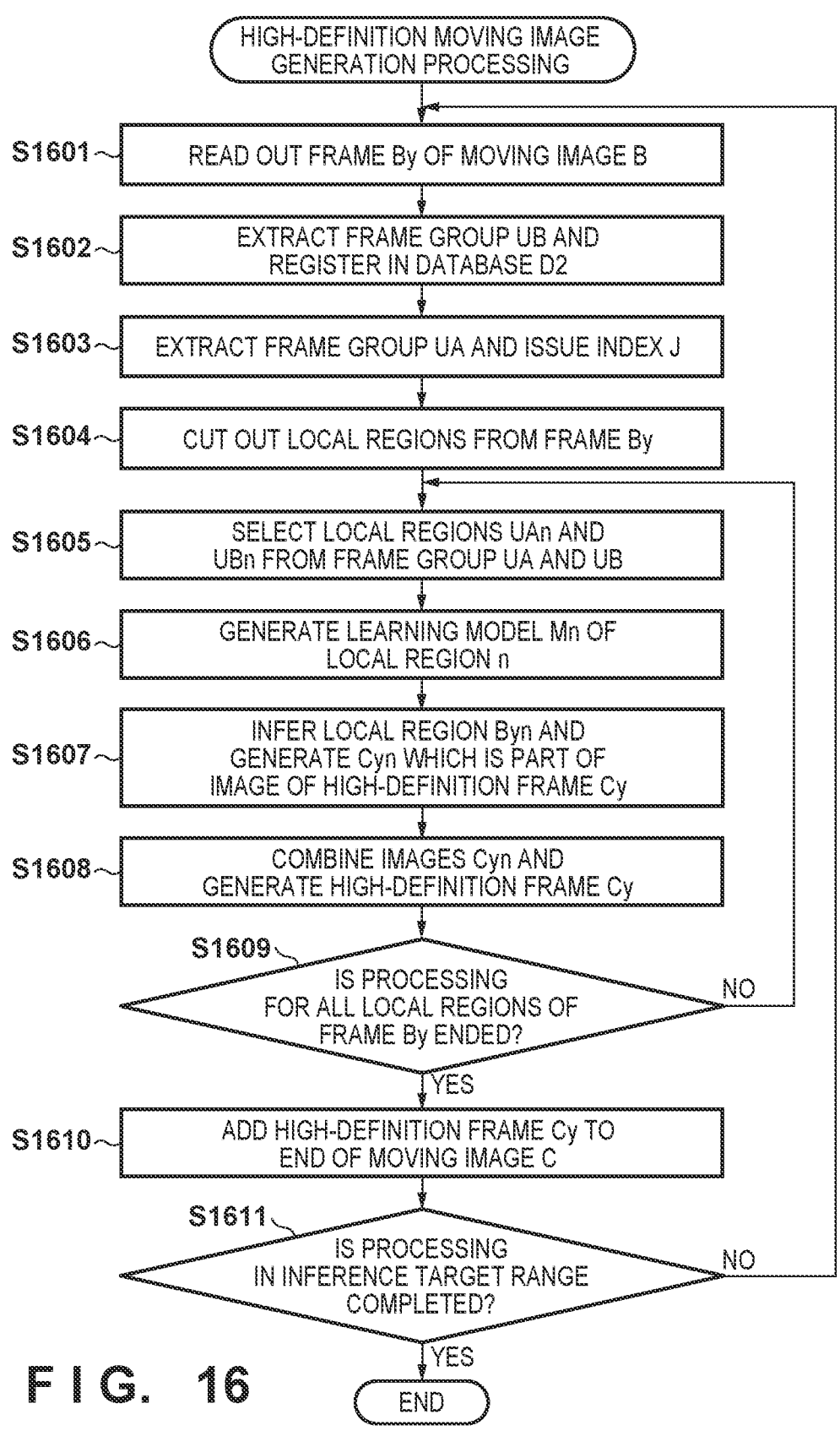

HIGH-DEFINITION MOVING IMAGE
GENERATION PROCESSING

S1601 — READ OUT FRAME By OF MOVING IMAGE B

S1602 — EXTRACT FRAME GROUP UB AND
REGISTER IN DATABASE D2

S1603 — EXTRACT FRAME GROUP UA AND ISSUE INDEX J

S1604 — CUT OUT LOCAL REGIONS FROM FRAME By

S1605 — SELECT LOCAL REGIONS UAn AND
UBn FROM FRAME GROUP UA AND UB

S1606 — GENERATE LEARNING MODEL Mn OF
LOCAL REGION n

S1607 — INFER LOCAL REGION Byn AND
GENERATE Cyn WHICH IS PART OF
IMAGE OF HIGH-DEFINITION FRAME Cy

S1608 — COMBINE IMAGES Cyn AND
GENERATE HIGH-DEFINITION FRAME Cy

S1609 — IS PROCESSING
FOR ALL LOCAL REGIONS OF
FRAME By ENDED? — NO

YES

S1610 — ADD HIGH-DEFINITION FRAME Cy TO
END OF MOVING IMAGE C

S1611 — IS PROCESSING
IN INFERENCE TARGET RANGE
COMPLETED? — NO

YES

END

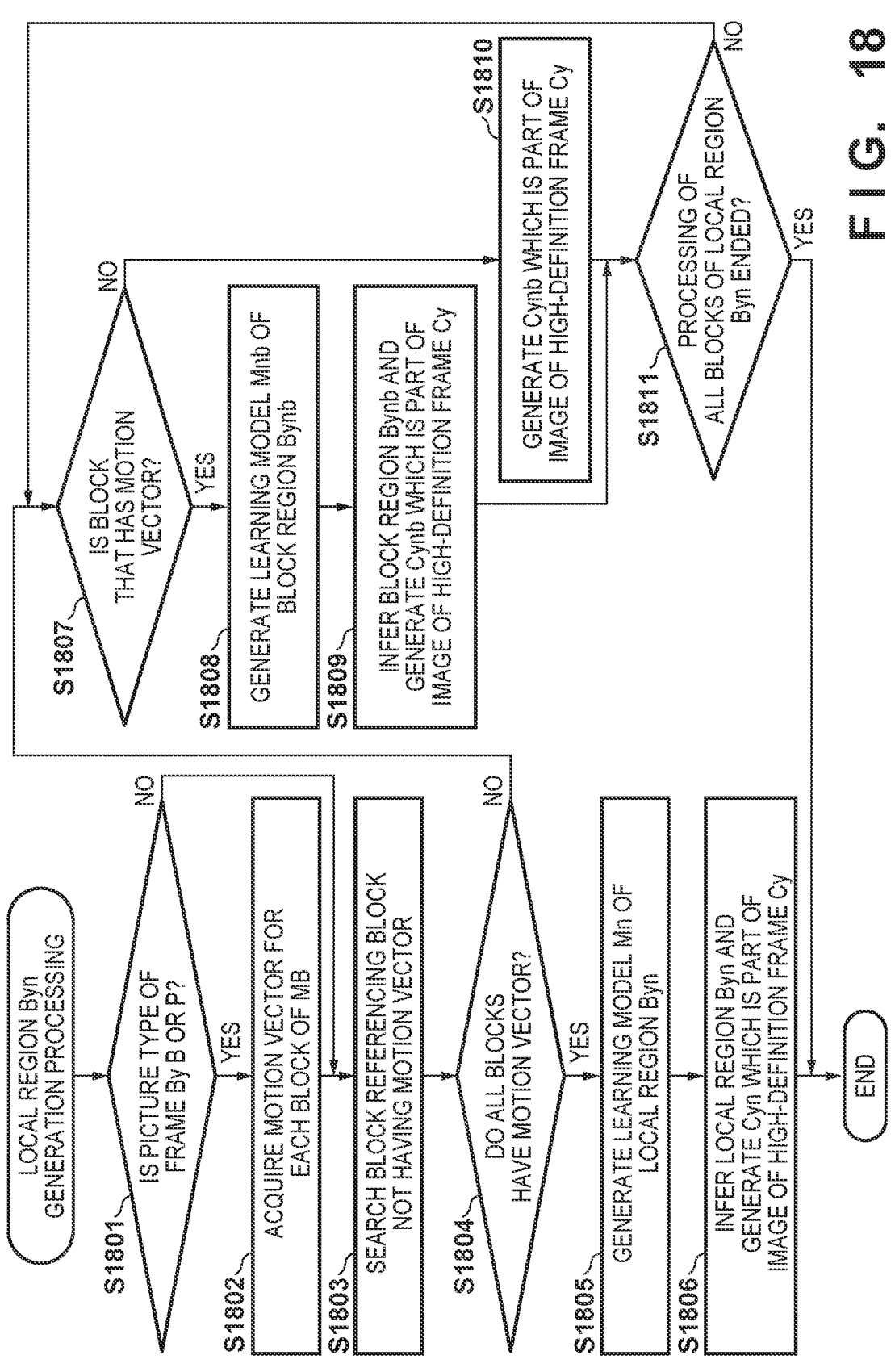
F I G. 18

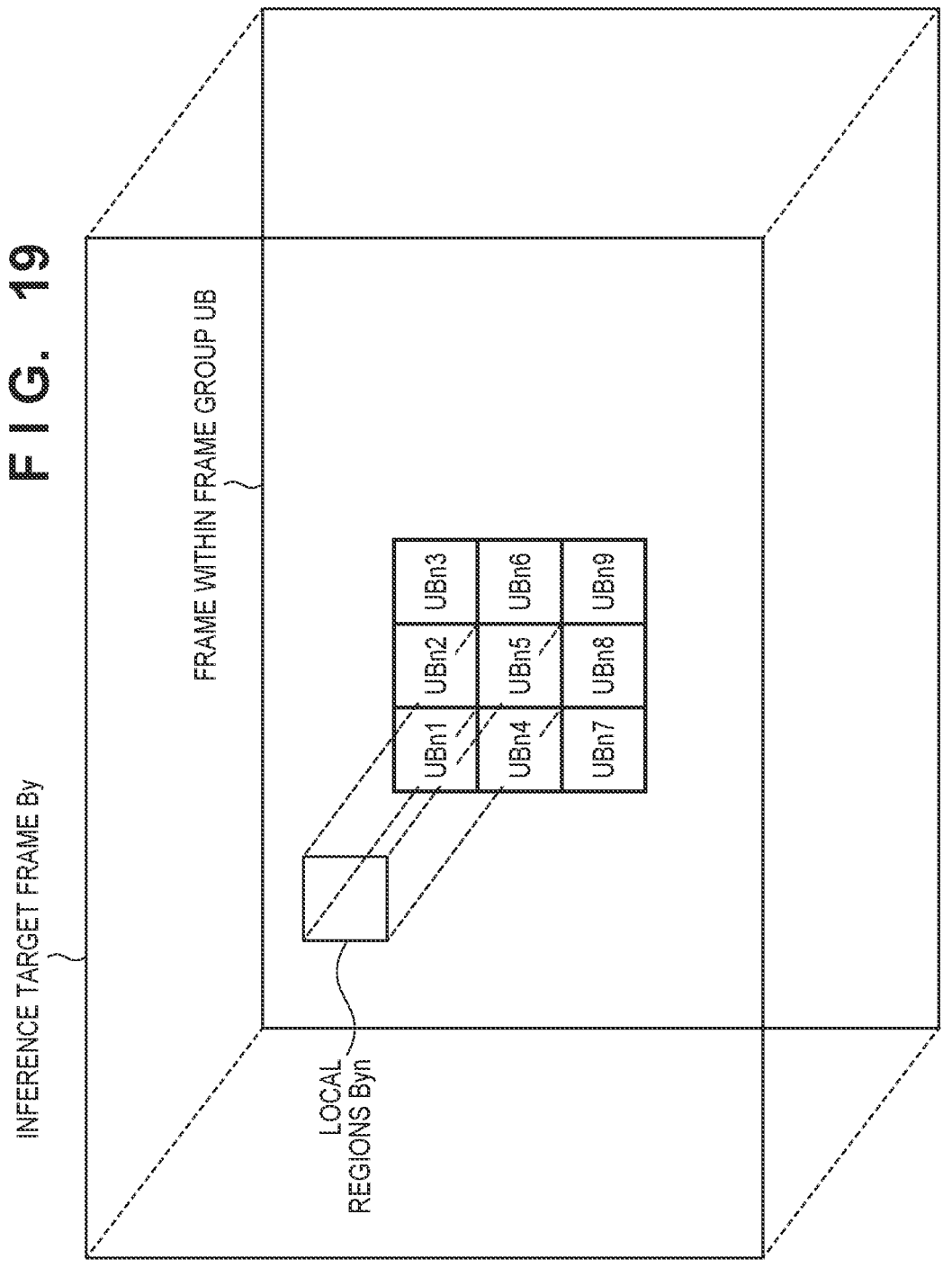
F I G. 19

IMAGE PROCESSING APPARATUS AND METHOD, AND STORAGE MEDIUM

BACKGROUND OF THE INVENTION

Field of the Invention

The present invention relates to an image processing apparatus and method for achieving high definition of an image group by using machine learning.

Description of the Related Art

A super-resolution technology using machine learning is a technology for generating a high-definition image by inferring, through machine learning, high-frequency components that cannot be compensated by linear interpolation processing of pixel values, in performing resolution conversion with enlarging an image. In the super-resolution technology, a learning model is first generated by using, as supervisory data, an image group G and deteriorated images obtained by deteriorating each image of the image group G in an arbitrary method. The learning model is generated by learning differences in pixel values between an original image and a deteriorated image, and updating super-resolution processing parameters held by the learning model. When an image H lacking high-frequency components is input to the learning model generated as described above, the high-frequency components are obtained by inference using the learning model. A high-definition image can be generated by superimposing the high-frequency components obtained by inference on the image H. When super-resolution processing is performed on a moving image, a high-definition moving image can be generated by inputting all frames into the learning model one by one.

In general, in the case where a product or a service using a learning model is provided, a process of collecting supervisory data and generating a learning model is performed by a developer, and the generated learning model is provided to a user. Therefore, contents of a moving image to be input by the user are unknown at a time of performing the learning process. Therefore, the developer prepares a large number of various images having no bias in image patterns as supervisory data and repeatedly performs learning so that inference can be performed with equal accuracy for all inference target moving images.

For example, Japanese Patent Laid-Open No. 2019-204167 describes a technology for performing super-resolution processing on a moving image by using a learning model that has learned a variety of images. However, since the supervisory data is of great variety, there is very few supervisory data that has a higher degree of similarity to an inference target moving image Q specified by a user. When such a learning model is used, the result of learning an image having a low similarity to the inference target moving image Q is reflected in inference processing. As a result, only perceived resolution is improved by edge enhancement of an object, and it is difficult to accurately infer high-frequency components such as detailed patterns of the object, and thus inference accuracy cannot be said to be high.

As an example of a system for solving such a problem. Japanese Patent Laid-Open No. 2019-129328 describes a method in which learning is performed on a user side by using only images similar in terms of image capturing location, image capturing conditions, and the like with an inference target moving image as supervisory data, so that a moving image with higher definition is obtained as compared to a case where a variety of images are learned.

In Japanese Patent Laid-Open No. 2019-129328, learning is performed using supervisory data having a common image capturing location and different image capturing times. More specifically, images captured in the past in a partial section S of a route of a fixed-route bus are accumulated and learned, and a resulting learning model is used to execute inference with respect to real-time images of the section S. In this case, since supervisory data is limited to the data captured in the section S, an image group has a relatively high degree of similarity to the inference target, and thus improvement in the inference accuracy can be expected. However, among the images captured in the section S, for example, an image at the starting point of the section S and an image at the end point of the section S are different from each other in terms of image capturing locations, and thus objects captured in the images are different and it cannot be said that the images have a high degree of similarity. This constitutes a factor to reduce the inference accuracy in the entire section S. In addition, objects captured are different between past images serving as supervisory data and inference target real-time images even when these images are captured at an identical location. Accurate inference is not performed on objects that have not been learned, which constitutes a factor to reduce the inference accuracy.

Japanese Patent Laid-Open No. 2019-129328 describes that past images are classified into a plurality of groups according to image capturing conditions such as weather, a plurality of learning models are generated by individually learning the data of each group, and a learning model to be used is switched according to the image capturing conditions of real-time images. According to such a technique, it is possible to suppress the reduction in inference accuracy due to differences in image capturing conditions. However, even when conditions such as weather are common, a slight difference in values such as illuminance causes a difference in frequency components between supervisory data and the inference target, and thus it cannot be said that the reduction in inference accuracy can be sufficiently suppressed. Based on the factors above, even in the technique of Japanese Patent Laid-Open No. 2019-129328, the inference accuracy of the high-frequency components is not sufficient.

SUMMARY OF THE INVENTION

The present invention has been made in view of the problems described above, and provides an image processing apparatus that can achieve high definition of an image with a high degree of accuracy using machine learning.

According to a first aspect of the present invention, there is provided an image processing apparatus configured to achieve high definition of an image of a second image group by using a first image group, the second image group having less high-frequency components in a corresponding frame than the first image group, the image processing apparatus comprising: at least one processor or circuit configured to function as, a selection unit configured to select, based on a high-definition target image selected from the second image group, a pair of supervisory data to be used for learning among a plurality of pairs of supervisory data each including an image included in the first image group as one of a pair of images, a learning model generation unit configured to generate a learning model by using the pair of supervisory data selected by the selection unit, an inference unit configured to infer high-frequency components of the high-definition target image by using the learning model generated, and an image generation unit configured to generate a high-definition image based on the high-definition target image and the high-frequency components inferred by the inference unit.

According to a second aspect of the present invention, there is provided a method for achieving high definition of an image of a second image group by using a first image group, the second image group having less high-frequency components in a corresponding frame than the first image group, the method comprising: selecting, based on a high-definition target image selected from the second image group, a pair of supervisory data to be used for learning among a plurality of pairs of supervisory data each including an image included in the first image group as one of a pair of images; generating a learning model by using the pair of supervisory data selected in the selecting; inferring high-frequency components of the high-definition target image by using the learning model generated; and generating a high-definition image based on the high-definition target image and the high-frequency components inferred in the inferring.

Further features of the present invention will become apparent from the following description of exemplary embodiments with reference to the attached drawings.

BRIEF DESCRIPTION OF THE DRAWINGS

FIG. 2 is a diagram illustrating a functional configuration of an image processing apparatus according to the first embodiment.

FIG. 3 is a diagram illustrating an example of a frame configuration of an input moving image according to the first embodiment.

FIG. 4 is a diagram illustrating a functional configuration of an image processing apparatus according to the first embodiment.

FIG. 5 is a diagram illustrating an example of a data configuration of a candidate database according to the first embodiment.

FIG. 8 is a schematic diagram illustrating a learning/inference step according to the first embodiment.

FIG. 10 is a flowchart of a process of supervisory data candidate acquisition according to the second embodiment.

FIG. 11 is a diagram illustrating an example of a frame configuration of an input moving image according to a third embodiment.

FIG. 12 is a flowchart of a process of supervisory data candidate acquisition according to the third embodiment.

FIG. 15 is a flowchart of a process of high-definition moving image generation according to the fifth embodiment.

FIG. 16 is a flowchart of a process of high-definition moving image generation according to a sixth embodiment, a seventh embodiment, an eighth embodiment, and a ninth embodiment.

FIG. 17 is a diagram illustrating an example of a learning/inference process according to the sixth embodiment.

FIG. 18 is a flowchart of a process of high-definition moving image generation according to the eighth embodiment.

FIG. 19 is a diagram illustrating an example of region selection of supervisory data according to the ninth embodiment.

DESCRIPTION OF THE EMBODIMENTS

Figure 1:
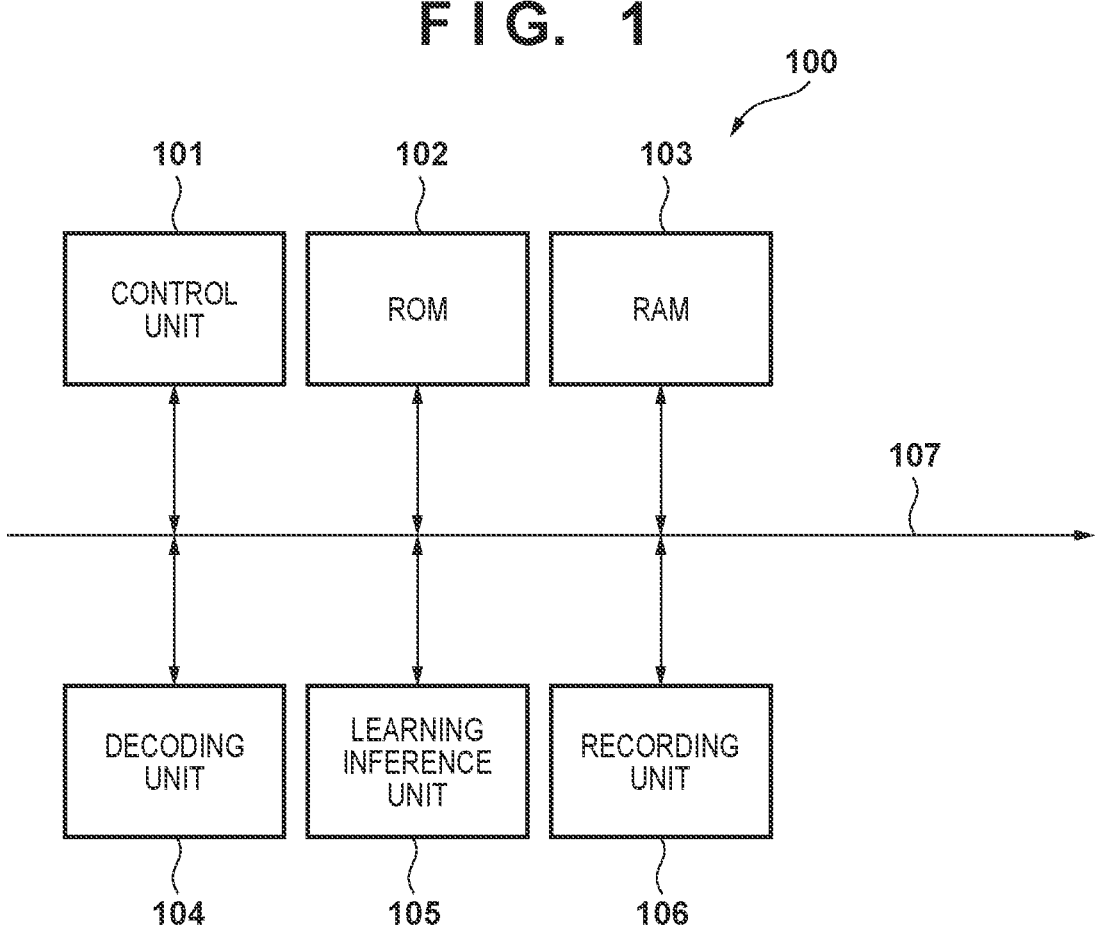
FIG. 1 is a block diagram illustrating a configuration of an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Outline Description of Image Processing Apparatus

An image processing apparatus according to a first embodiment uses, as an input, two moving images A and B simultaneously captured by an identical image capturing apparatus. The relationship between a resolution XA and a frame rate FA of the moving image A and a resolution XB and a frame rate FB of the moving image B satisfies "XA>XB and FA<FB". The image processing apparatus has a function to generate a learning model by using the frames of the moving image A and the moving image B, and generate a moving image C having the resolution XA and the frame rate FB from the moving image B by inference using the generated learning model (function of high-definition moving image generation).

Description of Configuration of Image Processing Apparatus

FIG. 1 is a block diagram illustrating an example of a hardware configuration of an image processing apparatus 100 according to the first embodiment. A control unit 101 is an arithmetic apparatus such as a CPU, and implements various functions by deploying programs stored in a ROM 102 into a work area of a RAM 103 and executing the program. The control unit 101 may function as, for example, each functional block of an analysis unit 211 and a decoded moving image generation unit 212 to be described later with reference to FIG. 2, and a candidate acquisition unit 413 and a supervisory data extraction unit 414 to be described later with reference to FIG. 4. The ROM 102 stores a control program to be executed by the control unit 101. The RAM 103 is used by the control unit 101 as a work memory for executing a program, or a temporary storage area of various types of data.

A decoding unit 104 decodes moving image data or image data compressed in a coding format defined by Moving Picture Experts Group (hereinafter abbreviated as MPEG) into uncompressed data. A learning inference unit 105 includes a functional block (a learning unit 451 to be described later with reference to FIG. 4) that generates/updates a learning model by inputting supervisory data. The learning inference unit 105 further includes a functional block (an inference unit 452 to be described later with reference to FIG. 4) that analyzes an input image by using the learning model generated through learning, infers high-frequency components, and generates a high-definition image of the input image. In the present embodiment, a Convolutional Neural Network (hereinafter abbreviated as CNN) model for super resolution processing based on CNN is used as a learning model. Here, an input image is enlarged by linear interpolation, high-frequency components to be added to the enlarged image are generated, and addition and synthesis of the enlarged input image and the high-frequency components are performed.

A recording unit 106 is constituted by a recording medium such as a hard disk drive (HDD) and memory card removably connected to the image processing apparatus 100, and a recording medium control apparatus configured to control the recording medium. The recording medium control apparatus controls the initialization of the recording medium and the data transfer between the recording medium and the RAM 103 performed for reading and/or writing data, and the like, in accordance with a command from the control unit 101. A bus 107 is an information communication path connecting respective functions. The control unit 101, the ROM 102, the RAM 103, the decoding unit 104, the learning inference unit 105, and the recording unit 106 are communicatively connected to each other.

Note that the hardware blocks and the functional blocks implemented therein described in the present embodiment need not have the configurations described above. For example, two or more blocks among the control unit 101, the decoding unit 104, and the learning inference unit 105 may be implemented by one hardware. Also, a function of one functional block or functions of a plurality of functional blocks may be executed by a cooperative operation of several pieces of hardware. Each functional block may be implemented by the CPU executing a computer program deployed in a memory, or may be implemented by dedicated hardware. In addition, there may be a configuration in which some of the functional blocks are present on a cloud server, and processing result data is transferred by communication.
Data Recorded in Recording Medium and Methods for Decoding and Decompressing the Same FIG. 2 is a diagram illustrating a functional block for executing decompression processing of compressed moving image data by the control unit 101 (the analysis unit 211 and the decoded moving image generation unit 212). The recording unit 106 stores a moving image a and a moving image b that are input data for high-definition moving image generation processing. Here, the moving image refers to one or more pieces of temporally-consecutive image data. In the present embodiment, the moving image a and the moving image b are simultaneously captured by an image capturing apparatus including an image sensor, and compressed by the MPEG method. The moving image a and the moving image b may be generated by performing thinning out and reduction process on respective images captured by a single image sensor, or by capturing an identical object with image sensors having different resolutions and frame rates. In the following, it is assumed that the moving image a and the moving image b are two image groups obtained by performing different image processing on one image captured by one image sensor included in one image capturing apparatus. Each of the moving image a and the moving image b are compressed by the MPEG method, multiplexed with image capturing time information, and stored in the MP4 format. Note that, as long as a pair of image data and corresponding image capturing time information can be acquired from the recording unit 106, a format other than the format above may be used.

The analysis unit 211 has a function to parse moving image data (an MP4 format file, in this example) recorded in the recording unit 106, and calculate storage locations, in the file, of compressed image data contained and time information registered as metadata. In the MP4 format, location information indicating recording locations in the file of each frame data and image capturing time information are recorded in the moov atom. The analysis unit 211 deploys the moov atom of the moving image a from the recording unit 106 into the RAM 103 and parses the moov atom to generate a table Pa having frame numbers, location information of frame data, and location information of image capturing time in the moving image a. The analysis unit 211 also parses the moov atom of the moving image b in a similar manner, and generates a table Pb having frame numbers, location information of frame data, and location information of image capturing time in the moving image b. The table Pa and the table Pb are held in the RAM 103.

For use in the high-definition moving image generation processing, it is necessary to perform a process of converting the moving image a and the moving image b to non-compression formats. As illustrated in FIG. 2, the decoded moving image generation unit 212 of the control unit 101 decodes the moving image a and the moving image b to generate a moving image A and a moving image B and stores the moving image A and the moving image B in the recording unit 106. More specifically, the decoded moving image generation unit 212 refers to the table Pa and the table Pb held in the RAM 103, and sequentially inputs the frame data of the moving image a and the moving image b stored in the recording unit 106 into the decoding unit 104. The decoded moving image generation unit 212 multiplexes the frame data of the non-compression format output by the decoding unit 104 with the image capturing time information acquired by referring to the table Pa and the table Pb, and records the same in the recording unit 106. In the following, it is assumed that the moving image A is obtained by decoding the moving image a and the moving image B is obtained by decoding the moving image b. The decoded moving image generation unit 212 generates a table PA having frame numbers, location information of frame data, and location information of image capturing time in the moving image A, and records the table PA in the RAM 103. Similarly, the decoded moving image generation unit 212 generates a table PB having frame numbers, location information of frame data, and location information of image capturing time in the moving image B. and records the table PB in the RAM 103. FIG. 3 illustrates an example of a frame configurations of the moving image A and the moving image B. In FIG. 3, the total number of frames of the moving image A is n, and the total number of frames of the moving image B is m. A pair of frames indicated by dashed lines (a plurality of pairs of images A1 and B2, A2 and B5, A3 and B8, and the like) is a pair of frames having an identical image capturing time information, and indicates that images of these frames have been captured at an identical timing.

Next, a process of generating a high-definition image according to the present embodiment will be described. This process is broadly divided into two, that is "supervisory data candidate acquisition processing" and "high-definition moving image generation processing".

FIG. 4 is a diagram illustrating an operation of a functional block in image processing by the image processing apparatus 100 according to the first embodiment. As described in FIG. 2, the moving image A and the moving image B are held in the recording unit 106, and the table PA and the table PB are held in the RAM 103. The "supervisory data candidate acquisition processing" is performed by the candidate acquisition unit 413, and the "high-definition moving image generation processing" is performed by the supervisory data extraction unit 414, the learning unit 451, and the inference unit 452. The candidate acquisition unit 413 extracts pairs of frames that are candidates for supervisory data for learning from a frame group of the moving image A and a frame group of the moving image B as supervisory data candidates, and generates a candidate database D1. A frame By that is a target of high-resolution and high-definition processing is acquired from the frame group of the moving image B. In order to generate a learning model suitable for inference of the high-frequency components of the frame By, the supervisory data extraction unit 414 extracts supervisory data further suitable for learning from supervisory data candidates registered in the candidate database D1 and generates a supervisory database D2. The learning unit 451 of the learning inference unit 105 generates a learning model M for the frame By by using the supervisory database D2. The inference unit 452 inputs the frame By that is a target of the high-resolution processing into the learning model M generated by the learning unit 451, and performs the high-definition processing of the frame By. In the following, the "supervisory data candidate acquisition processing" and the "high-definition moving image generation processing" are described in more detail.

Supervisory Data Candidate Acquisition Processing

In the supervisory data candidate acquisition processing, the candidate database D1 is generated by the control unit 101 (candidate acquisition unit 413). In the first embodiment, the candidate acquisition unit 413 acquires, from the frames of the moving image A and the moving image B, a pair of a frame of the moving image A and a frame of the moving image B that are identical in image capturing time as a supervisory data candidate. Specifically, all pairs of frames of the moving image A and the moving image B that have an identical image capturing time (the pairs of frames indicated by dashed lines in FIG. 3) are acquired as supervisory data candidates. The candidate acquisition unit 413 examines which frames can be used as supervisory data before execution of learning processing to be described later, and creates the candidate database D1 to register the examination results.

FIG. 5 illustrates an example of a data configuration of the candidate database D1. Frame numbers in respective moving image files of a frame group TA that can be used as supervisory data in the frame group of the moving image A and a frame group TB that can be used as supervisory data in the frame group of the moving image B are registered in the candidate database D1. Here, the pairs of frames (pairs of frame numbers) that are identical in image capturing time are registered while being associated with each other by unique indices I in the candidate database D1. For example, in the moving image A and the moving image B illustrated in FIG. 3, the pairs of frames A1 and B2, A2 and B5. A3 and B8 (the rest is omitted) are combinations of frames captured at identical times. The candidate database D1 illustrated in FIG. 5 indicates that these pairs are recorded with frame numbers and assigned the unique indices I. In this way, the acquired supervisory data candidates are managed by the candidate database D1.

Figure 6:
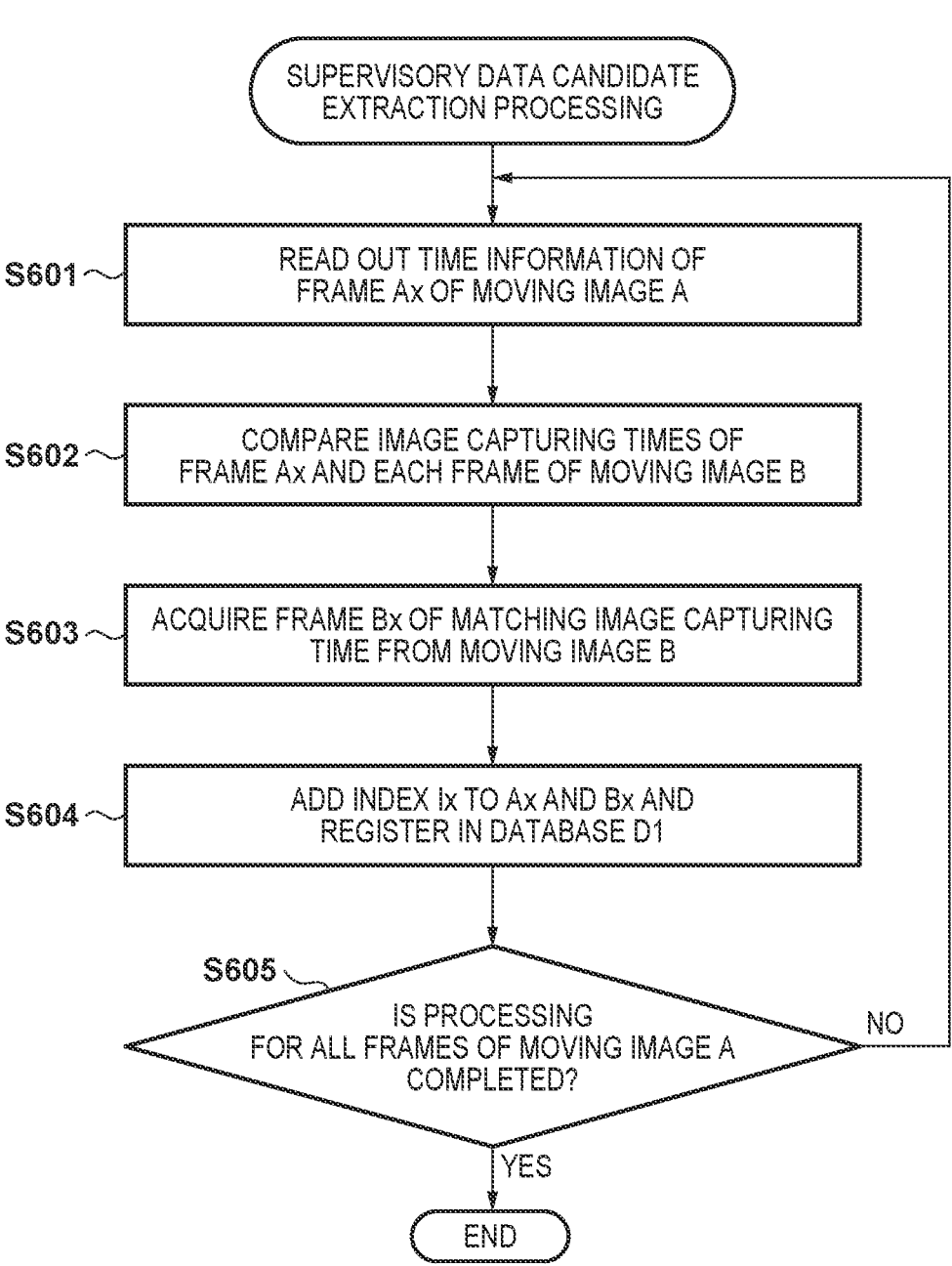
FIG. 6 is a flowchart of a process of supervisory data candidate acquisition according to the first embodiment.

The supervisory data candidate acquisition processing described above will be further described in detail using the flowchart of FIG. 6. In S601, the candidate acquisition unit 413 selects one frame of the moving image A and acquires time information corresponding to the selected frame from the table PA. In the present embodiment, frames are selected in order from the beginning of the moving image A recorded in the recording unit 106. More specifically, the candidate acquisition unit 413 selects frames one by one in order from the beginning of the moving image A recorded in the recording unit 106. Hereinafter, a selected frame is described as a frame Ax. The candidate acquisition unit 413 reads out time information corresponding to the frame Ax from the recording unit 106 by referring to the table PA recorded in the RAM 103, and transfer the time information to the RAM 103.

In S602, the candidate acquisition unit 413 compares the time information of the frame Ax read out in S601 with time information of each frame of the moving image B. Specifically, the candidate acquisition unit 413 sequentially acquires image capturing time information of each frame of the moving image B from the recording unit 106 by referring to the location information of image capturing times recorded in the table PB, and compares the acquired image capturing time information with the time information of the frame Ax. In S603, the candidate acquisition unit 413 acquires a frame of the moving image B having the image capturing time that matches the time information of the frame Ax. and defines the frame as a frame Bx.

In S604, the candidate acquisition unit 413 assigns a unique index Ix to a combination of the frame Ax and the frame Bx in the candidate database D1, and registers the combination in the candidate database D1. Specifically, the candidate acquisition unit 413 issues the unique index Ix to the combination of the frame Ax and the frame Bx, and registers the index Ix, the frame number of the frame Ax in the moving image A. and the frame number of the frame Bx in the moving image B, in the candidate database D1.

In S605, the control unit 101 determines whether or not the above-described processing of S601 to S604 has been completed for all the frames of the moving image A. When it is determined that the processing has been completed (YES in S605), the control unit 101 ends the processing. When it is determined that the processing has not been completed (NO in S605), the control unit 101 returns the processing back to S601, and executes the above-described processing on the next frame of the moving image A. The candidate database D1 is generated by the processing described above.

Note that, in the present embodiment, a pair of frames to be registered in the candidate database D1 is determined based on the comparison of respective image capturing times in S602, but the present invention is not limited thereto. For example, the frame Ax may be reduced to the resolution XB, similarity determination may be performed by using an index indicating the degree of similarity between the reduced frame Ax and an image of each frame of the moving image B, and then a pair of frames to be registered in the candidate database D1 may be selected using the determination result. In that case, the candidate acquisition unit 413 has a similarity determination function for determining the degree of similarity by comparing two or more pieces of image data. As an index indicating the degree of image similarity, a structural similarity (SSIM) index can be used, for example. Although the image of the frame Ax is reduced to the resolution XB in acquiring the index indicating the degree of similarity, the present invention is not limited thereto. The image of the frame Ax need not be reduced, or may be reduced to a resolution other than the resolution XB.

High-Definition Moving Image Generation Processing

Next, high-definition moving image generation processing performed by the control unit 101 (the supervisory data extraction unit 414) and the learning inference unit 105 (the learning unit 451 and the inference unit 452) will be described. First, an outline of the high-definition moving image generation processing will be described with reference to FIG. 4. The supervisory data extraction unit 414 selects supervisory data suitable for learning of "a learning model for inference target frame By" from the candidate database D1, and generates a supervisory database D2 (FIG. 4) (to be described later in detail with reference to S702 to S703 in FIG. 7). The learning unit 451 generates the learning model using the selected supervisory data (S704). Then, the inference unit 452 infers the high-frequency components of the inference target frame By by using the learning model and performs high-definition processing (S705) to obtain a frame (image) Cy that is a high-definition result of the inference target frame By. Note that, the control unit 101 generates a moving image C on the recording unit 106 before the start of the high-definition moving image generation processing. At the start of high-definition moving image generation, the moving image C is empty with no frame data. The inference unit 452 sequentially records generated frames Cy in the moving image C.

In the following, the above-described high-definition moving image generation processing will be described in more detail with reference to the flowchart of FIG. 7. In S701, the supervisory data extraction unit 414 reads out one frame as a high-definition target frame from the moving image B. In the present embodiment, the supervisory data extraction unit 414 reads out frames one by one in order from the beginning of the moving image B recorded in the recording unit 106. Hereinafter, a frame read out in S701 is referred to as a frame By. More specifically, the supervisory data extraction unit 414 reads out the frame data and the image capturing time information of the frame By from the recording unit 106 by referring to the table PB, and transfers the same to the RAM 103.

In S702, the supervisory data extraction unit 414 extracts, from a supervisory data candidate TB registered in the candidate database D1, a frame whose difference in image capturing time from the frame By is smaller than a threshold value predetermined in a system, and registers the frame in the supervisory database D2. As a threshold value, a display period of one frame of the moving image A (a display period of one frame at a frame rate XA) can be used, for example. The structure of the supervisory database D2 is similar to the structure of the candidate database D1 (FIG. 5). Specifically, first, the supervisory data extraction unit 414 acquires respective time information of the frame group TB registered in the candidate database D1 by referring to the location information in the table PB. The supervisory data extraction unit 414 compares the acquired respective time information with the image capturing time of the frame By, and extracts, from the frame group TB, a frame in which the difference between the time information and the image capturing time is smaller than the threshold value, and registers the frame in the supervisory database D2 on the RAM 103. Hereinafter, the frame group of the moving image B registered in the supervisory database D2 by the above processing is referred to as UB. In the present embodiment, in creating the supervisory database D2, a frame group whose difference in image capturing time from the frame By is smaller than the threshold value is extracted from the candidate database D1, but the present invention is not limited thereto. The frame group UB may be extracted by using an index indicating the degree of similarity to the frame By. For example, the supervisory data extraction unit 414 may extract a frame having a higher index of similarity to the frame By than a predetermined threshold value from the frame group TB by using the SSIM, and register the frame as the frame group UB.

In S703, the supervisory data extraction unit 414 registers, in the supervisory database D2, a frame of the frame group TA that is paired with each frame of the frame group UB in the candidate database D1. Specifically, the supervisory data extraction unit 414 refers to the candidate database D1 on the RAM 103, and registers, in the supervisory database D2, a frame of the frame group TA associated with each frame of the frame group UB by the index I. At this time, without changing combinations of associated two frames, a unique index J is assigned to each of the combinations in the supervisory database D2. Hereinafter, the frame group of the moving image A registered in the supervisory database D2 is referred to as UA.

In S704, the learning unit 451 performs learning by using the supervisory data (the frame group UA and the frame group UB) registered in the supervisory database D2, and generates a learning model M.

FIG. 8 is a diagram schematically illustrating a learning model generation function by the learning unit 451. The learning model generation function include a learning step and an inference step, and the inference step is divided into a feature extraction step using a filter including a CNN and a reconstruction step. First, in the feature extraction step, the learning unit 451 inputs a single image from the frame group UB into the CNN (an image E), and generates a number of feature maps by the CNN. Next, in the reconstruction step, the learning unit 451 generates expected high-frequency components by upsampling all the feature maps using deconvolution. In the reconstruction step, the learning unit 451 performs image reconstruction by adding an image E' obtained by enlarging the image E with a bicubic method or the like and the expected high-frequency components and generates an predicted high-definition image G. In the learning step, the learning unit 451 compares the predicted high-definition image G generated in the above-described inference step with an image H corresponding to the image E in the frame group UA, and performs fine tuning of the learning model M by an error backpropagation method using the difference of the predicted high-definition image G and the image H. The learning unit 451 improves the inference accuracy by repeating the above-described processing on the identical image E for predetermined times. By performing the above-described series of processing on each image of the frame group UB, the learning model M suitable for the inference processing of the frame group UB is created.

As described above, the learning unit 451 refers to the supervisory database D2, the table PA, and the table PB to read out frame data of the pair of frames registered as the supervisory data from the recording unit 106, and inputs the frame data to the learning model generation function described above. The learning unit 451 stores the learning model M generated by the learning model generation function in the RAM 103.

In S705, the inference unit 452 generates a high-definition frame Cy from the frame By by inference using the learning model M generated in S704. Specifically, first, the inference unit 452 reads out the learning model M stored in the RAM 103. Next, the inference unit 452 inputs the frame data (image) of the frame By stored in the RAM 103 in S701 into the CNN of the learning model M, and generates "high-frequency components expected when an image of the frame By is enlarged to the resolution XA". The inference unit 452 generates an image of the high-definition frame Cy having the resolution XA by adding the generated high-frequency components to "an image obtained by linearly enlarging the image of the frame By to the resolution XA", and records the image of the high-definition frame Cy in the RAM 103. Note that the processing from the inference of the high-frequency components to the generation of the high-definition image performed on the frame By is similar to the inference step described with reference to FIG. 8 above. The inference unit 452 adds the frame data of the high-definition frame Cy recorded in the RAM 103 at the end of the high-definition moving image C on the recording unit 106. In addition, the image capturing time information of By is copied and multiplexed as an image capturing time of the high-definition frame Cy, and recorded in the moving image C.

In S706, the control unit 101 determines whether or not the above-described processing has been completed for all the frames of the moving image B. When it is determined that the processing has not been completed (NO in S706), the control unit 101 causes the processing to proceed to S701, and the next frame of the moving image B is selected as the frame By by the supervisory data extraction unit 414, and the above-described processing is repeated. On the other hand, when it is determined that the processing has been completed (YES in S706), the control unit 101 ends the processing. As described above, upon completion of the high-definition moving image generation processing, the high-definition moving image C having the resolution XA and the frame rate FB is recorded in the recording unit 106 in a non-compression format.

In the above description, each functional block is implemented only by the control unit 101 or only by the learning inference unit 105, but the present invention is not limited thereto. For example, each functional block may be implemented by the cooperation between the control unit 101 and the learning inference unit 105. For example, the function of the inference unit 452 may be implemented by the control unit 101 and the learning inference unit 105, and the processing of recording the high-definition frame Cy and the image capturing time in the moving image C on the recording unit 106 may be executed by the control unit 101.

In addition, in the present embodiment, the supervisory data candidate acquisition processing is performed before the learning processing of the entire moving image and the high-definition moving image generation processing, but the supervisory data candidate acquisition processing may be executed in parallel with the execution of the high-definition moving image generation processing. Also, in the present embodiment, a learning model M is newly generated for each of inference target frames in S704 and a previously-generated learning model M is discarded, but the present invention is not limited thereto. For example, a learning model M' that is externally learned in advance may be loaded, and additional learning using the frame group UA and the frame group UB may be performed on the loaded learning model M' in S704.

As described above, according to the first embodiment, since the learning model M learned with an image group close to a high-definition target image among the image groups captured at an identical image capturing period is used, it is possible to achieve high definition of an image with a high degree of accuracy. Further, since pairs of images of identical times in two image groups are used as supervisory data, more accurate learning is possible.

Second Embodiment

Simultaneous Recording by a Plurality of Cameras

Figure 9:
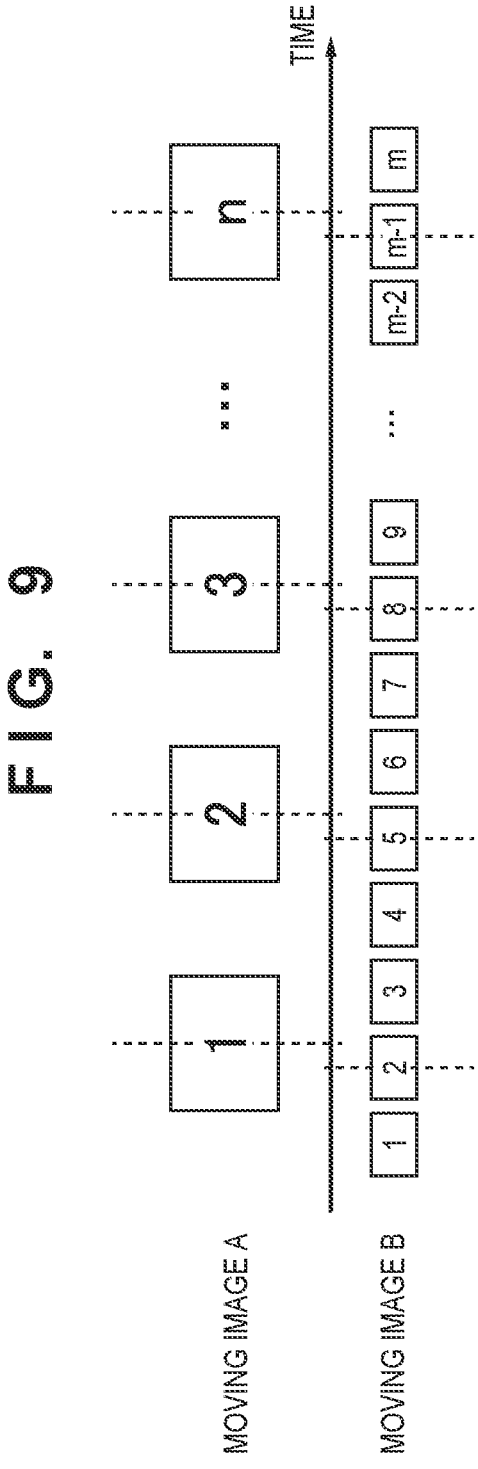
FIG. 9 is a diagram illustrating an example of a frame configuration of an input moving image according to a second embodiment.

In the supervisory data candidate acquisition processing according to the first embodiment, a combination of a frame of the moving image A and a frame of the moving image B that are identical in terms of image capturing time is registered in the candidate database D1. In the case where the moving image A and the moving image B are acquired from moving images simultaneously captured by an identical image sensor of one image capturing apparatus, frames having an identical image capturing time can be acquired from the moving image A and the moving image B as illustrated in FIG. 3. In this method, however, there is a possibility that candidates for supervisory data cannot be appropriately extracted when the moving image A and the moving image B are images that have been captured at the identical image capturing period by a plurality of image sensors. This is because, as illustrated in FIG. 9, a frame having the image capturing time identical to the image capturing time of a frame of the moving image A is not necessarily present in the moving image B. Examples of configurations in which the moving image A and the moving image B are captured by a plurality of image sensors include a configuration in which image capturing is performed using an image capturing apparatus including a plurality of image sensors, and a configuration in which image capturing is performed using a plurality of image capturing apparatuses including at least one image sensor. In supervisory data candidate acquisition processing according to a second embodiment, even when the image capturing time of a frame of the moving image A is not identical to the image capturing time of a frame of the moving image B, the above-described problem is solved by registering, in the candidate database D1, a combination of frames between which a difference in the image capturing times is smaller than a predetermined threshold value.

In the second embodiment, the configuration of the image processing apparatus 100 and the high-definition image generation processing are similar to those in the first embodiment, but part of the supervisory data candidate acquisition processing is different. FIG. 10 is a flowchart illustrating the supervisory data candidate acquisition processing according to the second embodiment. In the following, differences from the supervisory data candidate acquisition processing of the first embodiment (FIG. 6) will be mainly described.

The processing steps in S1001 to S1002 are respectively similar to the processing steps in S601 to S602 in the first embodiment (FIG. 6). In S1003, the candidate acquisition unit 413 acquires, among frames of the moving image B, a frame whose difference in image capturing time from one frame Ax of the moving image A is smaller than a predetermined threshold value as a frame Bx, and registers the frame Bx in the candidate database D1 on the RAM 103. As a threshold value, a display period per one frame at a frame rate XB of the moving image B can be used, for example. The processing steps in S1004 to S1005 are respectively similar to the processing steps in S604 to S605 in the first embodiment (FIG. 6).

As described above, according to the second embodiment, even when the moving image A and the moving image B are acquired by a plurality of image sensors, supervisory data candidates can be appropriately extracted.

Third Embodiment

Image Capturing at Different Times

In the first embodiment and the second embodiment, the moving image A and the moving image B are captured at least at the identical image capturing period. Thus, in the supervisory data candidate acquisition processing of the first embodiment and the second embodiment, no supervisory data candidates can be acquired when the moving image A and the moving image B are captured by an identical image capturing apparatus or a plurality of image capturing apparatuses at different times (no overlapping in image capturing period) as illustrated in FIG. 11. In a third embodiment, supervisory data candidate acquisition processing for appropriately acquiring supervisory data candidates for the moving image A and the moving image B as illustrated in FIG. 11 will be described.

In the supervisory data candidate acquisition processing in the third embodiment, an index indicating the degree of frame similarity between a frame of the moving image A and a frame of the moving image B is calculated, and pairs of frames having an index value equal to or higher than a threshold value predetermined in a system are registered in the candidate database D1. As an index indicating the degree of frame similarity, for example, an SSIM can be used as described above. In determining similarity, the image of a frame of the moving image A is reduced to the resolution XB, and an index indicating the degree of similarity is calculated using the reduced image and the image of each frame of the moving image B. However, at this time, the image of a frame of the moving image A need not be reduced, or may be reduced to a resolution other than the resolution XB.

FIG. 12 is a flowchart illustrating the supervisory data candidate acquisition processing according to the third embodiment. In the following, differences from the supervisory data candidate acquisition processing of the first embodiment (FIG. 6) will be mainly described with reference to the flowchart of FIG. 12.

In S1201, the candidate acquisition unit 413 selects one frame of the moving image A and reads the frame data of the selected frame. The candidate acquisition unit 413 selects frames one by one in order from the beginning of the moving image A recorded in the recording unit 106 (hereinafter, a selected frame is described as a frame Ax), and transfers the frame data of the frame Ax from the recording unit 106 to the RAM 103 by referring to the table PA recorded in the RAM 103.

In S1202, the candidate acquisition unit 413 calculates the degree of similarity between the frame Ax read out in S1201 and each frame of the moving image B. More specifically, the candidate acquisition unit 413 refers to location information (relating to frame data) on the table PB and sequentially acquires the frame data of each frame of the moving image B from the recording unit 106 to the RAM 103. Then, the candidate acquisition unit 413 calculates a similarity index of the frame Ax and each frame by a similarity index calculation function (SSIM in the present embodiment), and records the similarity index in the RAM 103. In S1203, the candidate acquisition unit 413 acquires a frame of the moving image B, having the highest similarity index value among the similarity indices calculated in S1202, as a frame Bx. The processing steps in S1204 to S1205 are respectively similar to the processing steps in S604 to S605 in the first embodiment (FIG. 6).

As described above, according to the third embodiment, it is possible to acquire appropriate supervisory data candidates even when image capturing periods of two image groups (the moving image A and the moving image B) are not overlapped.

Fourth Embodiment

Improving Learning Performance in Consideration of Image Similarity

In a fourth embodiment, as for the learning processing of the first embodiment to the third embodiment, improvement in the performance of the learning model M in consideration of image similarity will be described. As described in the first embodiment, appropriate supervisory data is extracted for the frame By selected in S701 of FIG. 7, and the learning model M is generated/updated using the supervisory data in S704. In generating/updating the learning model M, network parameter tuning using error backpropagation is performed as illustrated in FIG. 8. In the fourth embodiment, the intensity of the tuning by the error backpropagation is controlled based on attributes (image capturing time, for example) of a frame (image E) used for learning and a frame By that is a target of high resolution and high definition processing, or based on images of these frames. More specifically, in the learning step, the learning unit 451 determines coefficients such that an effect of the error backpropagation on network parameter update becomes larger when a similarity between each of sequentially-input frames of the frame group UB and the frame By is higher, and becomes smaller when the similarity is lower. Here, the image similarity may be determined simply based on a time difference between the frame By and the input image E, or may be determined by comparison of images of both frames using a SSIM or the like. For example, when the former (method using a time difference) is used, a configuration is such that a tuning intensity is multiplied by a coefficient of 1 when a time difference is smaller than a threshold, or a tuning intensity is multiplied by a coefficient of 0.5 when a time difference is equal to or larger than the threshold, as described below.

if ($ABS$(time difference between $By$ and $E$)<threshold){coefficient=1} else {coefficient=0.5}

On the other hand, when the latter (method using similarity) is used, a configuration is such that a structural similarity (SSIM) index is used as a coefficient of the tuning intensity, as described below.

coefficient=SSIM($By$ and $E$)[0≤SSIM($x$)≤1]

The magnitude of the effect may be determined by, for example, a method of multiplying an update rate of the network parameter in the error backpropagation by the above-described coefficient, a method of multiplying the number of learning loops for the input image E by the coefficient without multiplying the parameter update rate by the coefficient, or the like.

Fifth Embodiment

In the first embodiment to the third embodiment, a configuration in which pairs of frames of the moving image A and the moving image B are extracted as supervisory data candidates and registered in the candidate database D1 has been described. In a fifth embodiment, a moving image A' is generated by converting the moving image A into the resolution XB of the moving image B. and the candidate acquisition unit 413 acquires a supervisory data candidate using the moving image A and the moving image A'. In other words, the candidate acquisition unit 413 of the fifth embodiment extracts a frame (Ax') having the identical frame number with the frame Ax of the moving image A from the moving image A', and registers a pair of the frame Ax and the frame Ax' as a supervisory data candidate to the candidate database D1 The fifth embodiment will be described in detail below.

Description of Configuration of Image Processing Apparatus 100

The hardware configuration and the functional configuration of the image processing apparatus 100 are similar to those of the first embodiment (FIG. 1). However, the control unit 101 of the fifth embodiment further has a resolution conversion function for executing reduction conversion of the resolution of an image by a bicubic method. In performing reduction processing of the resolution of image data recorded in the RAM 103, the resolution conversion function calculates a pixel value of a pixel requiring interpolation by referring to pixels around the pixel.

Data Recorded in Recording Unit 106 and Methods for Decoding and Decompressing the Same In the first embodiment, the moving image a and the moving image b stored in the recording unit 106 are converted to non-compression formats, and a decoded moving image a and a decoded moving image b are recorded in the recording unit 106 as a moving image A and a moving image B, respectively. In the fifth embodiment, the moving image A' is further generated by converting the moving image A into the resolution XB of the moving image B. More specifically, the control unit 101 refers to the table PA recorded in the RAM 103, and sequentially inputs the frame data of each frame of the moving image A (hereinafter referred to as a frame K) stored in the recording unit 106 into the resolution conversion function of the control unit 101. Then, a frame (hereinafter referred to as a frame K') of the frame data having the resolution XB is output by the resolution conversion function. The control unit 101 multiplexes the frame K' with the image capturing time information of the frame K read out from the recording unit 106 by referring to the table PA, and records the multiplexed frame K' as a frame of the moving image A' in the recording unit 106. In addition, a table PA' holding the frame number, location information of frame data, and location information of image capturing time data of each frame of the moving image A is recorded in the RAM 103.

Figure 13:
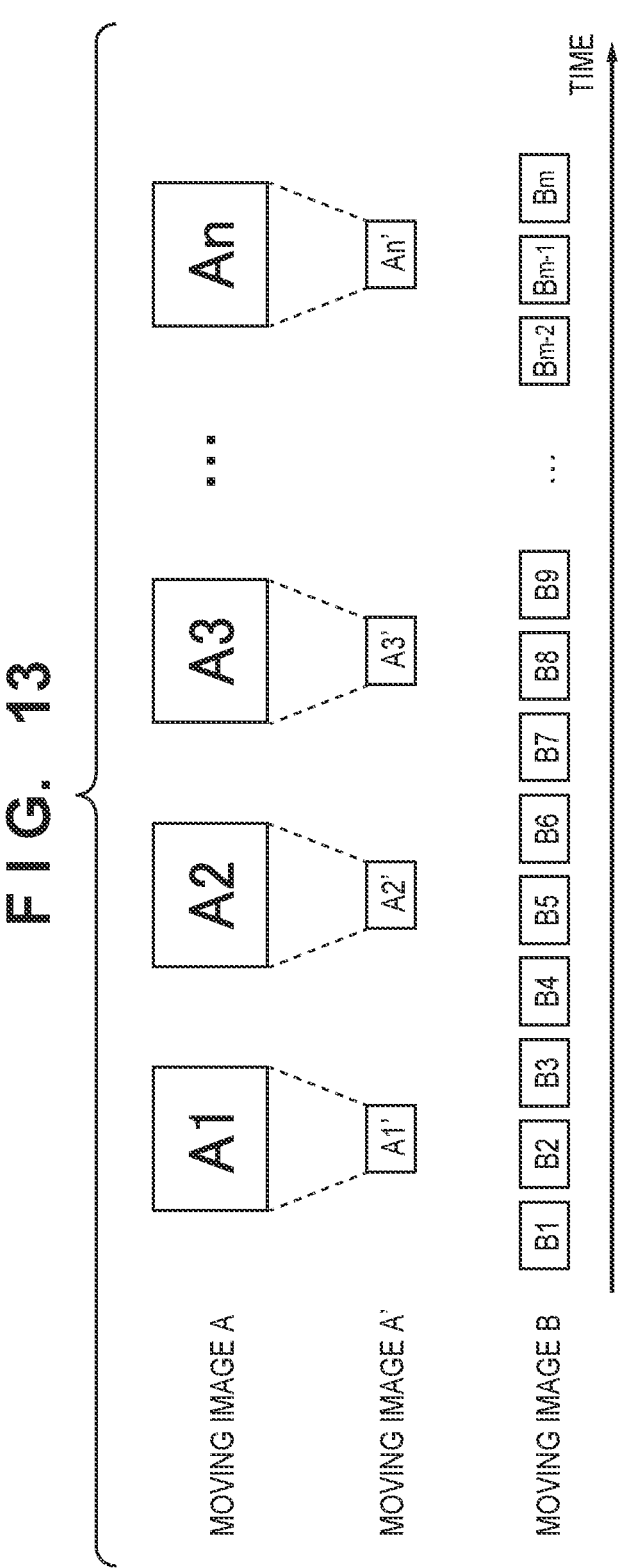
FIG. 13 is a diagram illustrating an example of a frame configuration of a moving image according to a fifth embodiment.

Examples of the moving image A, the moving image B, and the moving image A' are illustrated in FIG. 13. Images (A1 to An) of respective frames of the moving image A are reduced to the resolution XB to generate images (A1' to An'), and the generated images are recorded as the moving image A' in the recording unit 106. In the example described above, the resolution of the moving image A is reduced to XB, but the present invention is not limited thereto. The moving image A' may be an image that have been converted so as to have a resolution lower than the resolution of the moving image A. However, by using an image that have been converted so as to have the identical resolution with a high-definition target image, it is possible to create a learning model more suitable for the high-definition target image.

Supervisory Data Candidate Acquisition Processing

Figure 14:
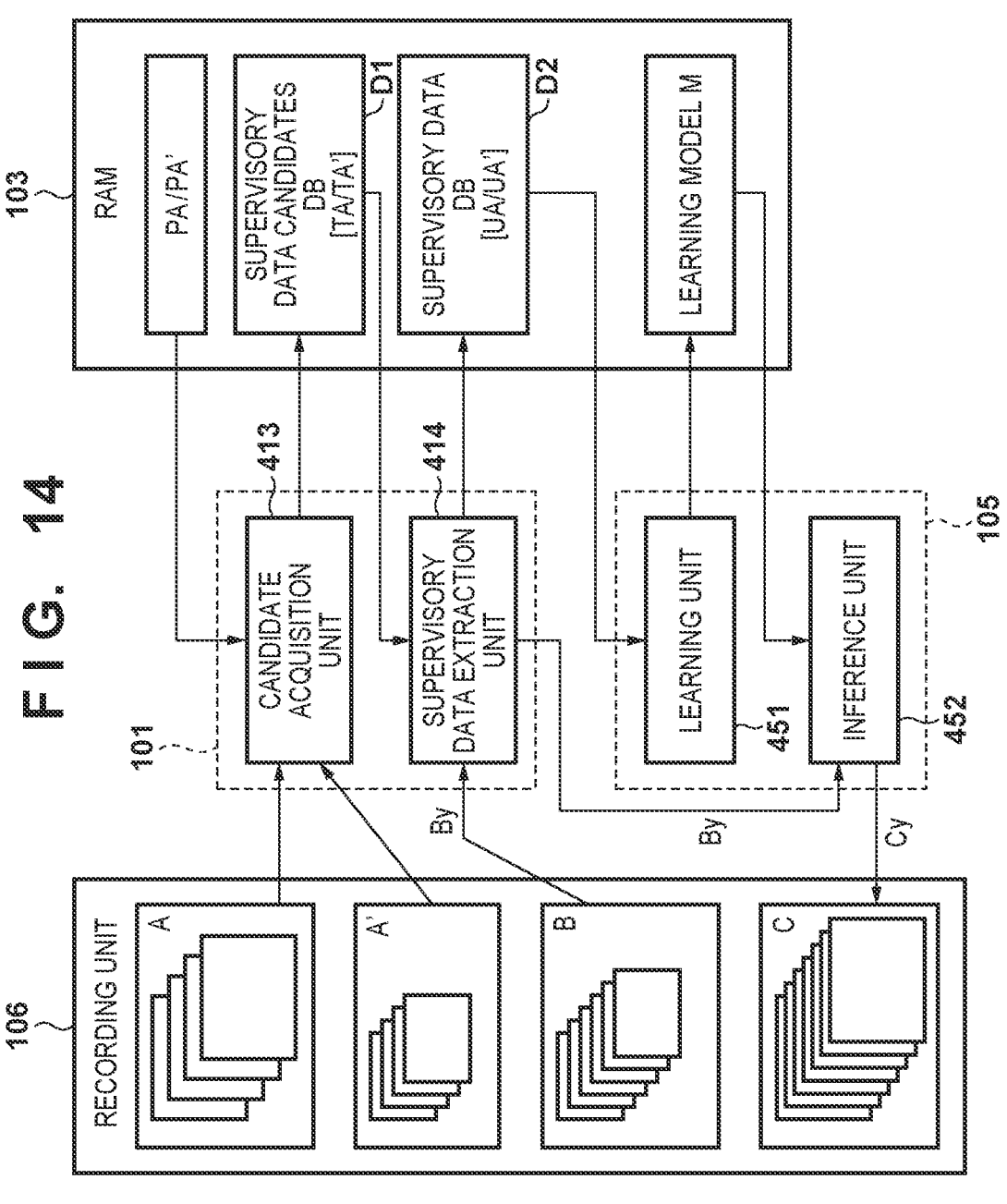
FIG. 14 is a diagram illustrating a functional configuration of an image processing apparatus according to the fifth embodiment.

FIG. 14 illustrates a configuration and operation of the functional block for image processing by the image processing apparatus 100 according to the fifth embodiment. The candidate acquisition unit 413 acquires a combination of frames having an identical frame number from respective frames of the moving image A and the moving image A', and registers the combination to the candidate database D1.

More specifically, the candidate acquisition unit 413 searches the moving image A' for a frame that is identical in terms of the frame number to each frame of the moving image A listed in the table PA by referring to the table PA'. The candidate acquisition unit 413 assign a unique index I to the combination of the frames of the moving image A and the moving image A' having the identical frame number, and registers the combination to the candidate database D1. The frame group of the moving image A and the frame group of the moving image A' registered in the supervisory database D1 are referred to as TA and TA', respectively.

High-Definition Moving Image Generation Processing

In the following, differences from the processing in the first embodiment (FIG. 7) will be mainly described with reference to the flowchart of FIG. 15.

Figure 7:
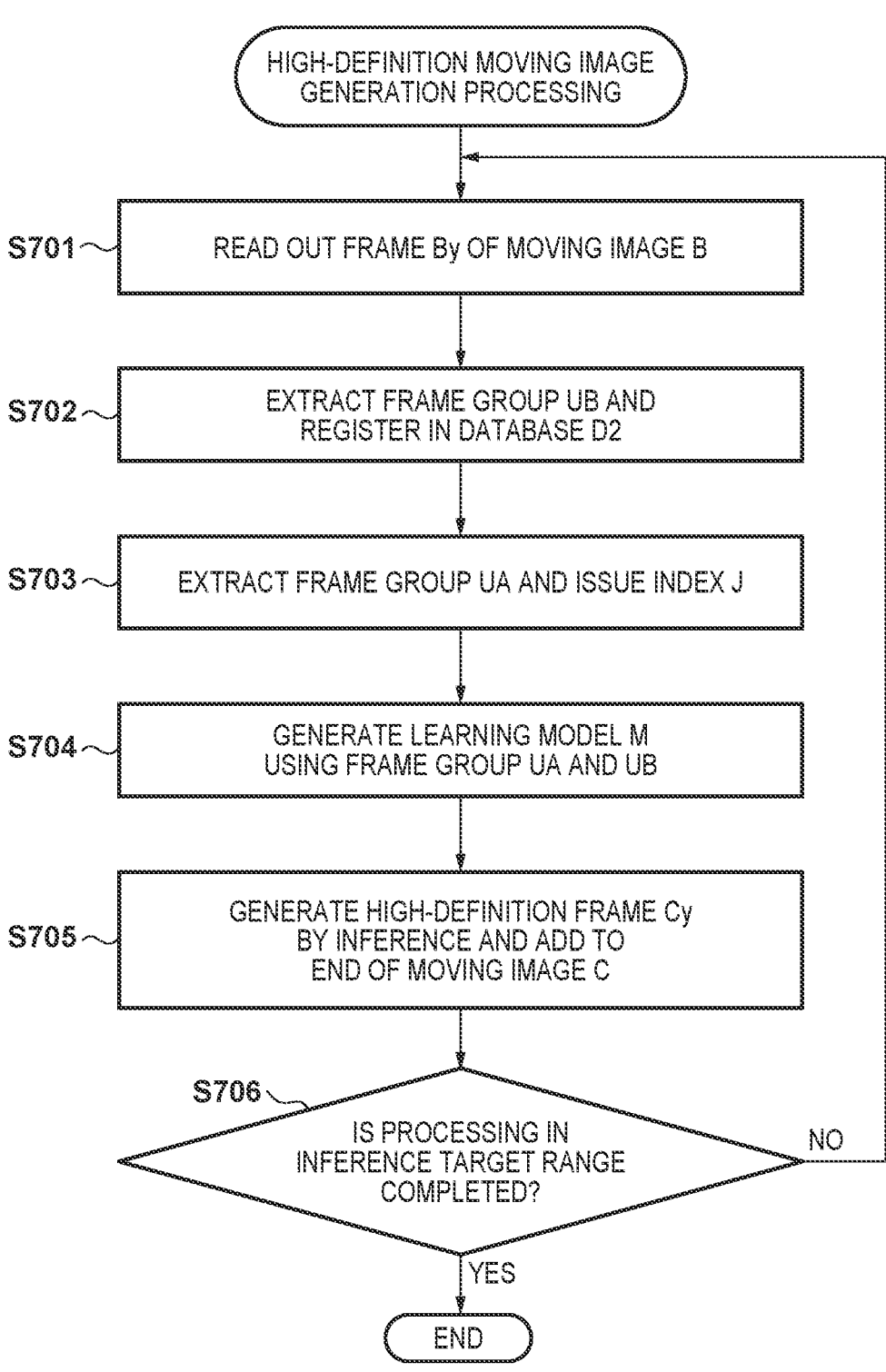
FIG. 7 is a flowchart of a process of high-definition moving image generation according to the first embodiment.

The processing in S1501 is similar to the processing in S701 in the first embodiment (FIG. 7). In S1502, the supervisory data extraction unit 414 extracts a frame in which the difference in image capturing time from the frame By is smaller than a threshold value predetermined in a system from the frame group TA', which is the candidate for supervisory data, registered in the candidate database D1. As a threshold value, a display period of one frame of the moving image A (a display period of one frame at a frame rate XA) can be used, for example. The supervisory data extraction unit 414 registers the extracted frame in the supervisory database D2.

Specifically, first, the supervisory data extraction unit 414 acquires time information of frames registered in the frame group TA' by referring to the table PA'. Based on the acquired time information, the supervisory data extraction unit 414 extracts a frame whose difference in time from the frame By is smaller than a threshold value from the frame group TA', and registers the frame in the supervisory database D2 on the RAM 103. Hereinafter, the frame group of the moving image A' registered in the supervisory database D2 is referred to as UA'. In the present embodiment, a frame whose difference in image capturing time from the frame By is smaller than a predetermined threshold value is extracted from the candidate database D1, but the present invention is not limited thereto. For example, using an index indicating the degree of image similarity between the image of each frame of the frame group TA' and the image of the frame By (SSIM, for example), a frame having a higher index value than a threshold value predetermined in a system may be extracted from the frame group TA' and registered in the supervisory database D2.

In S1503, the supervisory data extraction unit 414 registers a frame of the frame group TA, associated with each frame of the frame group UA' by the index I, in the supervisory database D2. Specifically, the supervisory data extraction unit 414 refers to the candidate database D1 on the RAM 103, and registers, a frame of the frame group TA associated with each frame of the frame group UA' by the index I, in the supervisory database D2. At this time, without changing the associated combinations (pairs of frames), a unique index J is assigned to each of the combinations in the supervisory database D2. Hereinafter, the frame group of the moving image A registered in the supervisory database D2 is referred to as a frame group UA.

In S1504, the learning unit 451 performs learning using the frame group UA and the frame group UA' by referring to the supervisory database D2, and generates a learning model M. Specifically, the learning unit 451 refers to the supervisory database D2, the table PA, and the table PA' to read out frame data from the recording unit 106, and inputs the frame data to a learning model generation function. The learning unit 451 performs learning using the frame data read out by the learning model generation function, stores the learning model M generated as a learning result in the RAM 103. Details of the learning of the learning model are as described above with reference to FIG. 8. The subsequent processing in S1505 and S1506 is similar to the processing in the first embodiment (the processing in S705 and S706 in FIG. 7).

As described above, according to each of the embodiments described above, supervisory data for use in the learning of a learning model is selected based on a high-definition target image. Therefore, the learning model learned using the selected supervisory data can infer the high-frequency components of the high-definition target image with higher accuracy, and can obtain a high-accuracy high-definition image. That is, the accuracy of the super-resolution technology for achieving high-definition moving images can be improved.

In the above-described embodiments, in acquiring supervisory data candidates, an image paired with an image selected from the moving image A is an image that is selected from the moving image B based on image capturing time or image similarity, or an image obtained by reducing the resolution of a selected image, but the present invention is not limited thereto. An image that is associated with an image selected from the moving image A and is used as a supervisory data candidate may be any image that has a lower resolution than the selected image and is associated with the selected image. Whether or not an image is associated with an image selected from the moving image A may be determined, for example, based on the commonality of an atmospheric temperature at image capturing, an image capturing location, an image capturing direction, and the like.

Also, in the above-described embodiments, two-step processing in which the candidate database D1 is generated and then the supervisory database D2 is generated has been described, but the present invention is not limited thereto. For example, the supervisory data extraction unit 414 may extract a frame that can be one of a pair as supervisory data from the moving image A based on the frame By, and obtain the supervisory data using the extracted frame and a frame associated with the extracted frame as the pair. However, when high-definition processing is sequentially performed on a plurality of images of the moving image B, it is more efficient to create the candidate database D1 and then extract and use appropriate supervisory data from the candidate database D1 depending on a high-definition target image as in each of the above-described embodiments.

Sixth Embodiment

Improving Learning Performance and Inference Performance in Consideration of Image Similarity In a sixth embodiment, as for the learning processing and the inference processing of the first embodiment, improvement in learning performance and inference performance in consideration of image similarity will be described.

In the first embodiment, appropriate supervisory data is extracted for the frame By selected in S701 of FIG. 7, the learning model M is generated/updated using the supervisory data in S704, and the high-definition frame Cy is generated by inference using the learning model M in S705. However, in this method, when various textures such as a person, a building, a plant, and the sea are contained in the frame By, there is a possibility that the learning performance is reduced because the amount of information to be learned at a time is too large. This is because one frame contains various patterns of high-frequency components. Therefore, in the learning processing of the sixth embodiment, in order to solve the above-described problem, local regions are cut out of one frame, a learning model is generated for each of the local regions, inference is performed using the learning model for each of the local regions, and high-definition images are generated for each of the local regions and combined.

Figure 17:
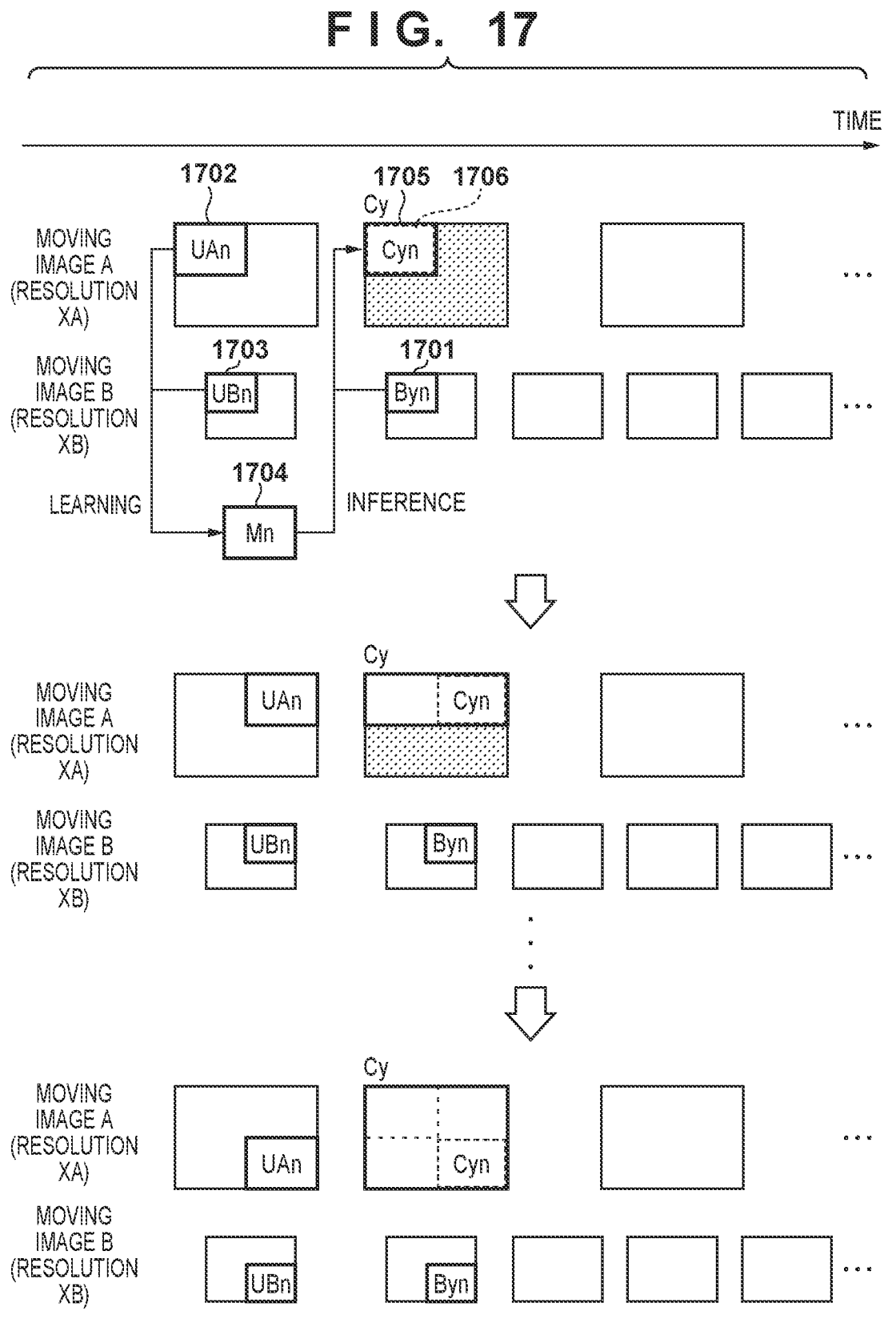

The hardware configuration and the functional configuration of the image processing apparatus 100 of the sixth embodiment are similar to those of the first embodiment (FIG. 1). Supervisory data to be extracted may be the supervisory data according to any one of the first embodiment to the fifth embodiment. Since the learning processing and the subsequent steps are different, a specific description will be given using the flowchart of FIG. 16 and an example of the learning inference processing of FIG. 17.

The processing in S1601 to S1603 is similar to the processing in S701 to S703 in the first embodiment (FIG. 7).

In S1604, the inference unit 452 cuts out local regions from an inference target frame By (local region determination), and holds the local regions in the RAM 103. Hereinafter, a cut out local region (local image) is referred to as a local region Byn 1701.

Next, in S1605, the learning unit 451 selects local regions UAn 1702 and UBn 1703 corresponding to the identical coordinate position with the local region Byn 1701 of the inference target frame By from the supervisory data (the frame group UA and the frame group UB) registered in the supervisory database D2 (local region selection), and holds the local regions UAn 1702 and UBn 1703 in the RAM 103. In the present embodiment, the supervisory data is a pair of local regions, but may be a plurality of pairs of local regions. Note that this local region group is, for example, a rectangular region having an equal size of several tens of pixels square, but is not limited thereto.

Note that, in the frame group UB, the above-described "local region corresponding to the identical coordinate position with" the inference target local region Byn 1701 is a region represented by exactly the identical coordinates with the local region Byn 1701 of the inference target frame By. That is, when the coordinates of the local region Byn 1701 of the inference target frame By are (sx, sy), the coordinates of the local region UBn 1703 are also (sx, sy). On the other hand, in the frame group UA, the ratio of the resolution XA of the moving image A to the resolution XB of the moving image B is considered. For example, when relation of XA:XB is 2:1 in both width and height and when the coordinates of the local region Byn 1701 of the inference target frame By are (sx, sy), the coordinates of the local region UAn 1702 are (sx*2, sy*2). Hereinafter, "the local region corresponding to the identical coordinate position" refers to the above description.

In S1606, the learning unit 451 generates a learning model Mn 1704 (local region learning model) with the learning model generation function illustrated in FIG. 8 by using the local region UAn 1702 and the local region UBn 1703. The learning unit 451 reads out the frame data of the pair of frames registered as the supervisory data from the recording unit 106, and input the frame data to the learning model generation function for each local region, and stores the generated learning model Mn 1704 in the RAM 103.

In S1607, the inference unit 452 performs inference on the local region Byn 1701 using the learning model Mn 1704 generated in S1606, and generates a local region Cyn 1705 that is a high-definition frame (local high-frequency components). First, the inference unit 452 reads out the learning model Mn 1704, which is stored in the RAM 103 in S1606. Next, the inference unit 452 inputs the local region Byn 1701, held in the RAM 103 in S1604, into the CNN of the learning model Mn 1704, and generates "high-frequency components expected when the local region Byn 1701 is enlarged to the local region UAn 1702". The inference unit 452 generates the local region Cyn 1705 by adding the generated high-frequency components to "an image obtained by linearly enlarging the image of the local region Byn 1701 to the local region UAn 1702", and records the local region Cyn 1705 in the RAM 103. Note that the processing from the inference of the high-frequency components to the generation of the high-definition image performed on the local region Byn 1701 is similar to the inference step illustrated in FIG. 8.

Next, in S1608, the inference unit 452 generates a high-definition frame Cy 1706 by combining the local regions Cyn 1705 of the high-definition frame Cy 1706 recorded in the RAM 103 based on coordinate position information of the frame, and holds the high-definition frame Cy 1706 in the RAM 103. Note that, in FIG. 17, 1705 indicated by the dashed line is the local region Cyn, and 1706 indicated by the solid line is the high-definition frame Cy.

In S1609, the control unit 101 determines whether or not the above-described processing has been completed for all the local regions of the frame By. When it is determined that the processing has not been completed (NO in S1609), the control unit 101 causes the processing to proceed to S1605, and repeats the above-described processing on the next local region of the frame By. On the other hand, when it is determined that the processing has been completed (YES in S1609), the control unit 101 causes the processing to proceed to S1610.

In S1610, the inference unit 452 adds the frame data of the high-definition frame Cy 1706 recorded in the RAM 103 at the end of the high-definition image C on the recording unit 106. In addition, the image capturing time information of By is copied and multiplexed as an image capturing time of the high-definition frame Cy 1706, and recorded in the moving image C.

In S1611, the control unit 101 determines whether or not the above-described processing has been completed for all the frames of the moving image B. When it is determined that the processing has not been completed (NO in S1611), the control unit 101 causes the processing to proceed to S1601, and repeats the above-described processing using the next frame of the moving image B as the frame By. On the other hand, when it is determined that the processing has been completed (YES in S1611), the control unit 101 ends the processing. As described above, upon completion of the high-definition moving image generation processing, the high-definition moving image C having the resolution XA and the frame rate FB is recorded in the recording unit 106 in a non-compression format.

As described above, according to the sixth embodiment, even in the case of a high-definition target image containing various textures and having a large amount of information, the amount of information to be learned at a time can be narrowed down by performing learning per a local region, and thus it is possible to perform learning with higher accuracy and generate an image with a higher definition.

Seventh Embodiment

Improving Super-Resolution Performance Using a Region Having a High Degree of Similarity to an Inference Target Region for Learning In a seventh embodiment, an example in which super-resolution performance is improved by changing the learning processing per a local region in the sixth embodiment will be described.

In the method of the sixth embodiment, a learning model is generated by using a region, for learning, located at the identical position with an inference target region in a frame different from an inference target frame. In this method, however, there is a problem that, when an object moves largely, the object may be captured differently between in an inference region and in supervisory data, reducing super-resolution performance.

Therefore, in the learning processing according to the seventh embodiment, in order to solve the above-described problem, a similarity evaluation unit is provided to search supervisory data candidates for a region having a high degree of similarity to an inference region, and the region having a high degree of similarity is used for learning.

High-Definition Moving Image Generation Processing

The seventh embodiment is different from the sixth embodiment only in the processing in S1605 in the flowchart of the high-definition moving image generation processing illustrated in FIG. 16. Thus, only the processing in S1605 according to the seventh embodiment will be described.

In S1605, the inference unit 452 cuts out partial regions from an inference target frame By and holds the partial regions as local regions in the RAM 103. Note that the local regions are, for example, rectangular regions having an equal size of several tens of pixels square, but are not limited thereto. The control unit 101 search a frame group UB of supervisory data registered in the supervisory database D2 for a region UBn having the highest degree of similarity to a local region of an inference target frame By by using an SSIM provided as a similarity evaluation unit, and holds the region UBn in the RAM 103. The learning unit 451 selects a frame to be paired with a frame to which the local region UBn held in the RAM 103 belongs, and holds, in the RAM 103, a local region UAn that is located in the frame at relatively the identical position with the local region UBn. Note that similarity evaluation may be based on a peak signal-to-noise ratio (PSNR), a signal-to-noise ratio (SNR), or a mean square error (MSE).

As described above, according to the seventh embodiment, since the learning is performed using a region having a high degree of similarity to an inference region, it is possible to generate an image having higher resolution even with a moving image in which an object moves largely.

Eighth Embodiment

Improving Super-Resolution Performance Using a Region Having a High Degree of Similarity to an Inference Target Region In an eighth embodiment, another solution to the problem in the sixth embodiment that is expected to be solved in the seventh embodiment will be described. Note that the problem in the sixth embodiment is that, since supervisory data for super-resolution processing of a local region of an inference target frame By is selected from another local region corresponding to the identical coordinate position with the local region, the super-resolution performance is reduced, for example, in the case where an object moves largely.

In the eighth embodiment, a method in which a region having a high degree of similarity is identified by using a motion vector relating to an inference region will be described. Note that, it is assumed that a moving image b in the eighth embodiment is compressed by using inter-frame prediction in the format of ISO/IEC 14496-10 "MPEG-4 Part 10: Advanced Video Coding" (hereinafter abbreviated as MPEG-4 AVC).

In the following, only differences of the eighth embodiment from the sixth embodiment will be described.
Data Recorded in Recording Medium and Methods for Decoding and Decompressing the Same In the processing by the analysis unit 211 according to the eighth embodiment, the following processing is performed in addition to the processing of parsing the moving image data recorded in the recording unit 106 (described in the first embodiment). The analysis unit 211 parses an MP4 file storing the moving image b, acquires an avcC box, and stores a sequence parameter set (hereinafter abbreviated as SPS) and a picture parameter set (hereinafter abbreviated as PPS) contained in the avcC box into the RAM 103.
High-Definition Moving Image Generation Processing The eighth embodiment differs from the sixth embodiment in the high-definition moving image generation processing in S1605 and S1606 in the flowchart of FIG. 16. Therefore, the processing in S1605 and S1606 in the eighth embodiment will be described using the flowchart of FIG. 18.

Note that the description will be given on the assumption that, in S1604 in the sixth embodiment, the inference unit 452 cuts out, from the inference target frame By, local regions having a rectangular shape in an equal size of 16 pixels square.

In S1801, when the inference target frame By is an I picture, the control unit 101 causes the processing to proceed to S1803. When the inference target frame By is a P picture or a B picture, the control unit 101 causes the processing to proceed to S1802.

In S1802, the control unit 101 acquires a macroblock layer from a local region of the inference target frame By. In addition, when a sub-macroblock is used, a sub-macroblock prediction is also acquired. Otherwise, a macroblock prediction is acquired.

With the sub-macroblock prediction or the macroblock prediction of a macroblock to which the local region of the inference target frame By belongs, the control unit 101 derives a prediction unit block region Bynb in the macroblock. The prediction unit block region Bynb is any of a macroblock, each block in a partitioned macroblock, each block of a sub-macroblock, or each block in a partitioned sub-macroblock.

The control unit 101 derives a motion vector of the block region Bynb, a referenced frame, mbPartIdx, and subMbPardIdx, with the SPS, the PPS, the macroblock prediction or the sub-macroblock prediction.

Here, the control unit 101 generates six pieces of information for each block region Bynb, that is, "mbPartIdx", "subMbPardIdx", "presence of motion vector", "motion vector", "reference/referenced frame", and "reference direction", and holds the information in the RAM 103. These are information for identifying a block region Bynb in the macroblock. As for the reference direction, a reference direction is a direction indicated by a motion vector from a macroblock of a local region of the inference target frame By, and a referenced direction is a direction from a macroblock in another frame toward the local region of the inference target frame By. Hereinafter, a set of the six pieces of information described above is referred to as motion vector information.

The control unit 101 checks whether or not the reference/referenced frame of the generated motion vector information is present in supervisory data candidates, and when there is no such a frame, updates the motion vector information such that the presence of motion vector is "No".

When an inference target frame is a B picture and is a block having two motion vectors, the referenced frame closer in temporal distance to the inference target frame is adopted. When both referenced frames are equal to each other in temporal distance to the inference target frame, information on the motion vector and the referenced frame closer in spatial distance indicated by the motion vector is adopted. When the spatial distance is also equal, either may be adopted.

In S1803, for a block region Bynb in which the presence of motion vector in the motion vector information is "No", the control unit 101 searches supervisory data candidates for a block referencing the block region Bynb. Note that the method of acquiring a motion vector and reference frame information necessary for determining whether or not a block references the block region Bynb has been described in S1802, and thus description thereof is omitted.

When a block referencing the block region Bynb is found, the motion vector information of the block region Bynb is updated. Note that a range of frame searching is within 3 frames before and after the frame including the block region Bynb. Also, a range of macroblock searching is within MaxVmvR for each level defined by the MPEG-4 AVC. MaxVmvR is derived based on the SPS of the moving image b. Note that the range of frame searching and the range of macroblock searching are not limited to these examples.

For each block region Bynb in which the presence of motion vector in the motion vector information is "Yes", the inference unit 452 acquires a local region UBXnb of a reference destination or a reference source from the frame group UB, and holds each local region UBXnb in the RAM 103. The inference unit 452 acquires, from the frame group UA, a local region UAXnb corresponding to the identical coordinate position with the local region UBXnb acquired based on the motion vector information of each block region Bynb recorded in the RAM 103, and holds each local region UAXnb in the RAM 103.

In S1804, the control unit 101 determines whether or not the presence of motion vector in the motion vector information in every block region Bynb is "Yes", and if "Yes", performs S1805. If "No", then S1807 is performed.

In S1805, the inference unit 452 generates a combined local region UBXn by combining the local regions UBXnb recorded in the RAM 103 based on the coordinate position information of each block region Bynd, and holds the combined local region UBXn in the RAM 103.

The inference unit 452 generates a combined local region UAXn by combining the local regions UAXnb corresponding to the identical coordinate positions with the local regions UBXnb recorded in the RAM 103 based on the coordinate position information of each block region Bynb, and holds the combined local region UAXn in the RAM 103.

The learning unit 451 generates a learning model Mn with the learning model generation function illustrated in FIG. 8 by using the combined local region UAXn and the combined local region UBXn. Note that the combined local region UBXn is supervisory data corresponding to the identical coordinate position with the combined local region UAXn of the pairs of frames. The learning unit 451 reads out the supervisory data from the RAM 103, inputs the supervisory data to the learning model generation function, and store the generated learning model Mn in the RAM 103.

In S1806, the inference unit 452 performs inference on the local region Byn of the frame By using the learning model Mn generated in S1805, and generates a local region Cyn 1705 that is a high-definition frame.

First, the inference unit 452 reads out the learning model Mn, stored in the RAM 103 in S1805. Next, the inference unit 452 inputs the local region Byn of the frame By held in the RAM 103 into the CNN of the learning model Mn, and generates "high-frequency components expected in the local region Byn when the inference target frame By is enlarged to the resolution XA". The inference unit 452 generates the local region Cyn 1705 by adding the generated high-frequency components to "the local region Byn linearly enlarged based on the ratio between the resolution XB and the resolution XA", and records the local region Cyn 1705 in the RAM 103. Note that the processing from the inference of the high-frequency components to the generation of the high-definition image performed on the local region Byn is similar to the inference step illustrated in FIG. 8.

In S1807, the control unit 101 determines whether or not the presence of motion vector in the motion vector information is "Yes" for each block region Bynb included in the local region Byn, and if "Yes", executes S1808. If "No", then S1811 is executed.

In S1808, the learning unit 451 generates a learning model Mnb with the learning model generation function illustrated in FIG. 8 by using the block region Bynb and the local region UBXnb, and holds the learning model Mnb in the RAM 103.

In S1808, the inference unit 452 generates the learning model Mnb for inferring the block region Bynb with the learning model generation function illustrated in FIG. 8 by using the local region UBXnb and the local region UAXnb recorded in the RAM 103. Note that the combined local region UBXnb is supervisory data corresponding to the identical coordinate position with the combined local region UAXnb of the pairs of frames. The learning unit 451 reads out the supervisory data from the RAM 103, inputs the supervisory data to the learning model generation function, and store the generated learning model Mnb in the RAM 103.

In S1809, the inference unit 452 performs inference on the block region Bynb using the learning model Mnb, and generates a local region Cynb that is a high-definition frame. First, the inference unit 452 reads out the learning model Mnb, stored in the RAM 103 in S1808. Next, the inference unit 452 inputs the block region Bynb held in the RAM 103 into the CNN of the learning model Mnb, and generates "high-frequency components expected in the block region Bynb when the inference target frame By is enlarged to the resolution XA". The inference unit 452 generates the local region Cynb by adding the generated high-frequency components to "the block region Bynb linearly enlarged based on the ratio between the resolution XB and the resolution XA", and records the local region Cynb in the RAM 103. Note that the processing from the inference of the high-frequency components to the generation of the high-definition image performed on the block region Bynb is similar to the inference step illustrated in FIG. 8.

In S1810, the control unit 101 holds, in the RAM 103, the local region Cynb of the high-definition frame Cy 1706 obtained by linearly enlarging the block region Bynb, in which the presence of motion vector in the motion vector information is "No", based on the ratio between the resolution XA and the resolution XB. Note that, as long as enlargement based on the ratio between the resolution XA and the Resolution XB is possible, methods of enlargement are not limited to linear enlargement.

In S1811, the control unit 101 determines whether or not the above-described processing has been completed for all the block regions Bynb. When it is determined that the processing has not been completed, the control unit 101 causes the processing to proceed to S1807 and performs the processing on the block regions Bynb for which the processing has not been completed. When it is determined that the processing has been completed, the control unit 101 reads out the local regions Cynb held in the RAM 103 in S1809 and S1810, and generates a local region Cyn 1705 by combining the local regions Cynb based on the coordinate position information of the corresponding block regions Bynb, and holds the local region Cyn 1705 in the RAM 103.

As described above, according to the eighth embodiment, since the learning is performed using a motion vector referencing/referenced to a region having a high degree of similarity to an inference region, it is possible to generate an image having higher resolution even with a moving image in which an object moves largely.

Ninth Embodiment

Improving Super-Resolution Performance Using Plural Pieces of Supervisory Data Weighted by Similarity In a ninth embodiment, another solution to the problem in the sixth embodiment that is expected to be solved in the seventh embodiment and the eighth embodiment will be described. Note that the problem in the sixth embodiment is that, since supervisory data for super-resolution processing of a local region of an inference target frame By is selected from another local region corresponding to the identical coordinate position with the local region, the super-resolution performance is reduced, for example, in the case where an object moves largely.

In the following, only differences of the ninth embodiment from the sixth embodiment will be described.

High-Definition Moving Image Generation Processing

The ninth embodiment is different from the sixth embodiment only in the processing in S1605 and S1606 in the flowchart of the high-definition moving image generation processing illustrated in FIG. 16. Thus, only the processing in S1605 and S1606 according to the ninth embodiment will be described.

In S1605, the control unit 101 selects local regions (UAn5 and UBn5) corresponding to the identical coordinate position with a local region Byn of an inference target frame By, and holds the local regions in the RAM 103. In addition, eight regions that are adjacent to the UBn5 and have the identical size with the UBn5 are held in the RAM 103. Similarly, eight regions that are adjacent to UAn5 and have the identical size with the UAn5 are held in the RAM 103. An example of region selection for a frame included in the frame group UB is illustrated in FIG. 19. Note that, in the present embodiment, a region having the identical position coordinates with the local region Byn and eight regions adjacent the region are selected with respect to an inference target region, but methods of the region selection are not limited to this.

Next, the control unit 101 evaluates each of UBn1 to UBn9 in terms of the degree of similarity to the local region Byn of the inference target frame By to obtain similarity evaluation values by using an SSIM provided as a similarity evaluation unit, generates learning number information for each of UBn1 to UBn9 (learning number determination), and holds the learning number information in the RAM 103. The learning number information includes "information identifying any of UBn1 to UBn9", "similarity evaluation value of similarity to the local region Byn", and "number of times of learning". When the similarity evaluation value of similarity to the local region Byn in the learning number information is smaller than a threshold value predetermined in a system, the control unit 101 updates the number of times of learning of the learning number information to 0. For each region having the similarity evaluation value equal to or greater than the threshold value, the number of times of learning is determined based on a ratio of the similarity evaluation values between regions having the similarity evaluation value equal to or greater than the threshold value, and the learning number information is updated. For example, when UBn4, UBn5, and UBn6 have the similarity evaluation value equal to or greater than the threshold value at a ratio of 2:5:3, and when a total number of times of learning is defined as 1000, the number of times of learning of the learning number information is set to 200 times, 500 times, and 300 times for UBn4, UBn5, and UBn6, respectively. Note that, in the method of determining the number of times of learning in the present embodiment, the number of times of learning is linearly allocated to regions having the similarity evaluation value exceeding the threshold value, but the method is not limited thereto.

In S1606, the learning unit 451 generates a learning model Mn with the learning model generation function illustrated in FIG. 8 by performing learning as many times as the number of times of learning of the learning number information indicated by the learning number information using, as supervisory data, the local region (any one of UBn1 to UBn9) indicated by the learning number information and any one of the local regions (UAn1 to UAn9) in the frame group UA corresponding to the local region indicated by the learning number information. The generated learning model Mn is stored in the RAM 103.

The processing in S1607 and the subsequent steps are the same as those of the sixth embodiment, and thus the description will be omitted.

As described above, according to the ninth embodiment, since each of a plurality of regions having a high degree of similarity to an inference region is used for learning according to the degree of similarity to the inference region, it is possible to generate an image having higher resolution even with a moving image in which an object moves largely.

As described above, according to the sixth embodiment to the ninth embodiment, since the amount of information to be used for learning of a learning model is narrowed down by determining a local region from a high-definition target image, and a local region of supervisory data having a high correlation with the local region determined from the high-definition target image is used for learning of a learning model, it is possible to infer the high-frequency components of the high-definition target image with higher accuracy, and obtain a high-accuracy high-definition image. That is, the accuracy of the super-resolution technology for achieving high-definition moving images can be improved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-167575, filed Oct. 12, 2021, which is hereby incorporated by reference herein in its entirety.

What is claimed is:

1. An image processing apparatus configured to achieve high definition of an image of a second image group by using a first image group, the second image group having less high-frequency components in a corresponding frame than the first image group, the image processing apparatus comprising:

at least one processor or circuit configured to function as:

a selection unit configured to select, based on a high-definition target image selected from the second image group, a pair of supervisory data to be used for learning from among candidate pairs registered in a candidate database in which frame pairs consisting of a frame of the first image group and a frame of the second image group having an image-capturing time difference equal to or less than a threshold are registered, the threshold being set to a display period of one frame of the first image group;

a learning model generation unit configured to generate a learning model;

an inference unit configured to infer high-frequency components; and an image generation unit configured to generate a high-definition image based on the high-definition target image and the high-frequency components inferred by the inference unit, wherein the at least one processor or circuit is configured to further function as:

a local region determination unit configured to cut out one or more local regions to be inferred from the high-definition target image, the one or more local regions being non-overlapping square blocks of N×N pixels obtained by dividing the high-definition target image into equal-sized blocks, and a local region selection unit configured to select a pair of local regions to be used for the learning from the pair of supervisory data obtained by the selection unit, based on one or more local images cut out by the local region determination unit, wherein the learning model generation unit is configured, for each said block, to generate a local region learning model immediately after the pair of local regions for the block is selected and before inference of the block, and to discard the generated local region learning model after the inference of the block, wherein the inference unit is configured to infer local region high-frequency components of the one or more local images cut out from the high-definition target image by using the local region learning model, and wherein the image generation unit is configured to generate and combine a high-definition image of the one or more local regions by using the local region high-frequency components and the one or more local images of the high-definition target image sequentially for each of the blocks.

2. The image processing apparatus according to claim 1, wherein the at least one processor or circuit is configured to further function as an acquisition unit configured to acquire pairs of a first image selected from the first image group and a third image that has less high-frequency components than the first image and is associated with the first image as candidates for the supervisory data, and wherein the selection unit is configured to select supervisory data to be used for the leaning from the candidates for the supervisory data.

3. The image processing apparatus according to claim 2, wherein the acquisition unit is configured to acquire the candidates for the supervisory data by acquiring the third image from the second image group.

4. The image processing apparatus according to claim 3, wherein the acquisition unit is configured to acquire, as the third image, an image having an identical image capturing time to the first image from the second image group.

5. The image processing apparatus according to claim 3, wherein the acquisition unit is configured to acquire, as the third image, an image having an image capturing time whose difference from an image capturing time of the first image is smaller than a predetermined threshold value, from the second image group.

6. The image processing apparatus according to claim 3, wherein the acquisition unit is configured to acquire, as the third image, an image having a largest similarity to the first image from the second image group.

7. The image processing apparatus according to claim 6, wherein the acquisition unit is configured to determine a similarity between an image obtained by reducing the first image to a resolution of the second image group and an image of the second image group.

8. The image processing apparatus according to claim 2, wherein the acquisition unit is configured to acquire, as the third image, an image obtained by reducing the first image to a lower resolution.

9. The image processing apparatus according to claim 8, wherein the third image is an image obtained by reducing the first image to a resolution of the second image group.

10. The image processing apparatus according to claim 2, wherein the selection unit is configured to select, as the supervisory data to be used for the learning, a candidate for the supervisory data including an image having an image capturing time whose difference from an image capturing time of the high-definition target image is smaller than a predetermined threshold value.

11. The image processing apparatus according to claim 2, wherein the selection unit is configured to select, as the supervisory data to be used for the learning, a candidate for the supervisory data including an image having a similarity to the high-definition target image greater than a predetermined threshold value.

12. The image processing apparatus according to claim 1, wherein the inference unit is configured to control parameter update by error backpropagation in the learning, based on the supervisory data to be used for the learning and the high-definition target image.

13. The image processing apparatus according to claim 12, wherein the inference unit is configured to determine a coefficient based on the supervisory data to be used for the learning and the high-definition target image, and control an amount of the parameter update by error backpropagation based on the coefficient.

14. The image processing apparatus according to claim 12, wherein the inference unit is configured to determine a coefficient based on the supervisory data to be used for the learning and the high-definition target image, and control number of repetitions of the parameter update by error backpropagation based on the coefficient.

15. The image processing apparatus according to claim 13, wherein the inference unit is configured to determine the coefficient based on a difference between an image capturing time of an image of the supervisory data to be used for the learning and an image capturing time of the high-definition target image.

16. The image processing apparatus according to claim 13, wherein the inference unit is configured to determine the coefficient based on a similarity between an image of the supervisory data to be used for the learning and the high-definition target image.

17. The image processing apparatus according to claim 1, wherein the local region selection unit is configured to select a local region corresponding to a coordinate position identical to the one or more local regions cut out by the local region determination unit from the pair of supervisory data obtained by the selection unit.

18. The image processing apparatus according to claim 17, wherein the image generation unit is configured to generate a high-definition image by combining the high-definition image of the one or more local regions based on information of the coordinate position.

19. The image processing apparatus according to claim 1, wherein the local region selection unit further includes an evaluation unit configured to evaluate a degree of image similarity, the evaluation unit is used to select a local region having a high degree of similarity to the one or more local regions determined by the local region determination unit from an image included in the pair of supervisory data obtained by the selection unit.

20. The image processing apparatus according to claim 1, wherein the local region selection unit is configured to select a local region by using a motion vector of an inference target region determined by the local region determination unit, or a motion vector referencing the inference target region, or both of the respective motion vectors.

21. The image processing apparatus according to claim 1, wherein the learning model generation unit further includes a number determination unit configured to determine number of times of learning for each supervisory data, the number determination unit is used to determine number of times of learning for each of a plurality of pairs of local regions for learning obtained by the local region selection unit, and the learning is performed as many as the number of times of learning determined.

22. The image processing apparatus according to claim 21, wherein the number determination unit further includes an evaluation unit configured to evaluate a degree of image similarity, the evaluation unit is used to acquire a degree of similarity between an inference target region determined by the local region determination unit and an image included in each of the plurality of pairs of local regions for learning obtained by the local region selection unit, and number of times of learning is determined based on the degree of image similarity.

23. The image processing apparatus according to claim 1, wherein the first image group and the second image group are two image groups obtained by performing different image processing on one image captured by one image sensor included in one image capturing apparatus.

24. The image processing apparatus according to claim 1, wherein the first image group and the second image group are image groups respectively captured by two image sensors.

25. The image processing apparatus according to claim 1, wherein a frame rate of the first image group is lower than a frame rate of the second image group.

26. A method for achieving high definition of an image of a second image group by using a first image group, the second image group having less high-frequency components in a corresponding frame than the first image group, the method comprising:

selecting, based on a high-definition target image selected from the second image group, a pair of supervisory data to be used for learning from among candidate pairs registered in a candidate database in which frame pairs consisting of a frame of the first image group and a frame of the second image group having an image-capturing time difference equal to or less than a threshold are registered, the threshold being set to a display period of one frame of the first image group;

generating a learning model;

inferring high-frequency components; and generating a high-definition image based on the high-definition target image and the high-frequency components inferred in the inferring;

cutting out one or more local regions to be inferred from the high-definition target image, the one or more local regions being non-overlapping square blocks of N×N pixels obtained by dividing the high-definition target image into equal-sized blocks, and selecting a pair of local regions to be used for the learning from the pair of supervisory data obtained in the selecting, based on one or more local images cut out in the cutting out, wherein in the learning model, for each said block, generating, a local region learning model is generated immediately after the pair of local regions for the block is selected and before inference of the block, and to discard the generated local region learning model after the inference of the block, wherein in the inferring, local region high-frequency components of the one or more local images cut out from the high-definition target image are inferred by using the local region learning model, and wherein in the generating, a high-definition image of the one or more local regions is generated and combined by using the local region high-frequency components and the one or more local images of the high-definition target image sequentially for each of the blocks.

27. A non-transitory computer-readable storage medium storing a program for causing a computer to function as each unit of an image processing apparatus configured to achieve high definition of an image of a second image group by using a first image group, the second image group having less high-frequency components in a corresponding frame than the first image group, the apparatus comprising:

a selection unit configured to select, based on a high-definition target image selected from the second image group, a pair of supervisory data to be used for learning from among candidate pairs registered in a candidate database in which frame pairs consisting of a frame of the first image group and a frame of the second image group having an image-capturing time difference equal to or less than a threshold are registered, the threshold being set to a display period of one frame of the first image group;

a learning model generation unit configured to generate a learning model;

an inference unit configured to infer high-frequency components; and an image generation unit configured to generate a high-definition image based on the high-definition target image and the high-frequency components inferred by the inference unit;

cutting out one or more local regions to be inferred from the high-definition target image, the one or more local regions being non-overlapping square blocks of N×N pixels obtained by dividing the high-definition target image into equal-sized blocks, and selecting a pair of local regions to be used for the learning from the pair of supervisory data obtained in the selecting, based on one or more local images cut out in the cutting out, wherein in the learning model generating, for each said block, a local region learning model is generated immediately after the pair of local regions for the block is selected and before inference of the block, and to discard the generated local region learning model after the inference of the block, wherein in the inferring, local region high-frequency components of the one or more local images cut out from the high-definition target image are inferred by using the local region learning model, and wherein in the generating, a high-definition image of the one or more local regions is generated and combined by using the local region high-frequency components and the one or more local images of the high-definition target image sequentially for each of the blocks.

* * * * *